(12) United States Patent
Suh et al.

(10) Patent No.: US 11,696,285 B2
(45) Date of Patent: Jul. 4, 2023

(54) METHOD AND APPARATUS FOR TRANSMITTING A SIGNAL IN A WIRELESS COMMUNICATION SYSTEM

(71) Applicant: LG ELECTRONICS INC., Seoul (KR)

(72) Inventors: Yong Hak Suh, Seoul (KR); Woochan Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 209 days.

(21) Appl. No.: 17/345,226

(22) Filed: Jun. 11, 2021

(65) Prior Publication Data

US 2022/0400475 A1 Dec. 15, 2022

(51) Int. Cl.
*H04W 72/20* (2023.01)

(52) U.S. Cl.
CPC .................... *H04W 72/20* (2023.01)

(58) Field of Classification Search
CPC .................................................... H04W 72/20
See application file for complete search history.

(56) References Cited

U.S. PATENT DOCUMENTS

2014/0056207 A1* 2/2014 Shin .................. H04B 7/0615
370/312

* cited by examiner

*Primary Examiner* — Duc C Ho
(74) *Attorney, Agent, or Firm* — Lee, Hong, Degerman, Kang & Waimey PC

(57) ABSTRACT

The present disclosure may provide a for receiving, by a terminal, a signal in a wireless communication system. Herein, the method for receiving, by the terminal, the signal may include: receiving common message configuration information and private message configuration information from a base station; receiving a signal including a common message and a private message from the base station; decoding the common message based on the common message configuration information; restoring a frequency signal by using the decoded common message; subtracting the restored frequency signal of the common message from the received signal; and decoding the private message.

15 Claims, 19 Drawing Sheets

METHOD AND APPARATUS FOR TRANSMITTING A SIGNAL IN A WIRELESS COMMUNICATION SYSTEM

BACKGROUND OF THE INVENTION

Field of the Invention

The description below is related to a wireless communication system supporting a rate splitting multiple access (RSMA) scheme and is related to a method and apparatus for transmitting a signal in the wireless communication system.

Description of the Related Art

A wireless communication system refers to a multiple access system supporting communication with multiple users by sharing available system resources (e.g., bandwidth, transmit power, etc.). Examples of the multiple access system include a code division multiple access (CDMA) system, frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

Meanwhile, as more communication devices require larger communication capacity, there is a need for improved mobile broadband communication as compared to existing radio access technology (RAT). Therefore, a communication system considering a service or UE sensitive to reliability and latency is being discussed. Next-generation radio access technology considering massive machine type communication (MTC) or ultra-reliable and low latency communication (URLLC) may be referred to as new radio access technology (RAT) or new radio (NR).

SUMMARY

The present disclosure is related to a method and apparatus for operating a terminal transmitting a signal based on a RSMA scheme in a wireless communication system.

The present disclosure is related to a method for configuring a common message and a private message based on a RSMA scheme in a wireless communication system.

The present disclosure is related to a method for transmitting configuration information of a common message and configuration information of a private message based on a RSMA scheme in a wireless communication system.

The present disclosure is related to a method for performing rate splitting based on feedback information according to a RSMA scheme in a wireless communication system.

The technical objects to be achieved in the present disclosure are not limited to the above-mentioned technical objects, and other technical objects that are not mentioned may be considered by those skilled in the art through the embodiments described below.

In an embodiment of the present disclosure, a method for receiving, by a terminal, a signal in a wireless communication system may be provided. Herein, the method for receiving, by the terminal, the signal may include: receiving common message configuration information and private message configuration information from a base station; receiving a signal including a common message and a private message from the base station; decoding the common message based on the common message configuration information; restoring a frequency signal by using the decoded common message; subtracting the restored frequency signal of the common message from the received signal; and decoding the private message.

Also, in an embodiment of the present disclosure, a terminal of a wireless communication system may include a transceiver and a processor coupled to the transceiver. Herein, the processor is configured to: receive common message configuration information and private message configuration information from a base station through the transceiver, receive a signal including a common message and a private message from the base station through the transceiver, decode the common message based on the common message configuration information, restore a frequency signal by using the decoded common message, subtract the restored frequency signal of the common message from the received signal, and decode the private message.

Also, in an embodiment of the present disclosure, a method for transmitting, by a base station, a signal in a wireless communication system may be provided. Herein, the method for transmitting the signal may include: transmitting common message configuration information and private message configuration information to each of multiple terminals; and transmitting a signal including a common message and a private message for the each of the multiple terminals to the each of the multiple terminals. Herein, the each of the multiple terminals is configured to: decode the common message based on the received common message configuration information on the each of the multiple terminals, restore a frequency signal by using the decoded common message, subtract the restored frequency signal of the common message from the received signal, and decode the private message.

Also, the following is commonly applicable to a terminal, a base station and a terminal operation method.

In an embodiment of the present disclosure, a part of a message, which is transmitted from a base station to a terminal, may be transmitted to the terminal through a common message, and the remaining part excluding the part may be transmitted to the terminal through a private message.

Also, in an embodiment of the present disclosure, a common message may be configured based on a partial message of each message of multiple terminals including a terminal.

Also, in an embodiment of the present disclosure, common message configuration information may include at least any one or more among a total number of bits of a common message, a number of message bits of a terminal included in the common message, a start position corresponding to a message of the terminal in the common message, bit to symbol mapping information of the common message, and encoder information of the common message.

Also, in an embodiment of the present disclosure, private message configuration information may include at least any one or more among a total number of bits of a private message, bit to symbol mapping information of the private massage, and encoder information of the private message.

Also, in an embodiment of the present disclosure, a terminal may receive common message configuration information and private message configuration information in a form of downlink control information (DCI) from a base station in every slot via a control channel.

Also, in an embodiment of the present disclosure, a terminal may receive common message configuration information and private message configuration information from a base station through a medium access control (MAC) control element (CE).

Also, in an embodiment of the present disclosure, a terminal may generate common message feedback information based on measurement of a common message and may generate private message feedback information based on measurement of a private message.

Also, in an embodiment of the present disclosure, a terminal may obtain, based on measurement, at least any one or more among a signal noise ratio (SNR), a signal interference noise ratio (SINR), and decoding error information.

Also, in an embodiment of the present disclosure, common message feedback information and private message feedback information may be transmitted to a base station through uplink control information (UCI).

Also, in an embodiment of the present disclosure, a base station may change rate splitting for a common message and a private message of a terminal based on common message feedback information and private message feedback information, and the base station may transmit changed common message configuration information and changed private message configuration information to a terminal based on the changed rate splitting.

Also, in an embodiment of the present disclosure, a base station may receive common message feedback information and private message feedback information from each of multiple terminals and may change rate splitting for a common message and a private message of a terminal by reflecting the common message feedback information and the private message feedback information for the each of the multiple terminals.

Also, in an embodiment of the present disclosure, a private message may be a message that is obtained from a received signal, from which a restored frequency signal of a common message is subtracted, through channel estimation based on identification information of a terminal.

The above-described aspects of the present disclosure are only a part of the preferred embodiments of the present disclosure, and various embodiments reflecting technical features of the present disclosure may be derived and understood by those skilled in the art on the basis of the detailed description of the present disclosure provided below.

The following effects may be produced by embodiments based on the present disclosure.

According to the present disclosure, the present disclosure may provide a terminal transmitting a signal based on a RSMA scheme in a wireless communication system.

The present disclosure may provide a method for configuring a common message and a private message based on a RSMA scheme in a wireless communication system.

The present disclosure may provide a method for transmitting configuration information of a common message and configuration information of a private message based on a RSMA scheme in a wireless communication system.

The present disclosure may provide a method for performing rate splitting based on feedback information according to a RSMA scheme in a wireless communication system.

Effects obtained in the present disclosure are not limited to the above-mentioned effects, and other effects not mentioned above may be clearly derived and understood by those skilled in the art, to which a technical configuration of the present disclosure is applied, from the following description of embodiments of the present disclosure. That is, effects, which are not intended when implementing a configuration described in the present disclosure, may also be derived by those skilled in the art from the embodiments of the present disclosure.

BRIEF DESCRIPTION OF THE DRAWINGS

The accompanying drawings are provided to aid understanding of the present disclosure, and embodiments of the present disclosure may be provided together with a detailed description. However, the technical features of the present disclosure are not limited to a specific drawing, and features disclosed in each drawing may be combined with each other to constitute a new embodiment. Reference numerals in each drawing may mean structural elements.

DETAILED DESCRIPTION

Figure 1:
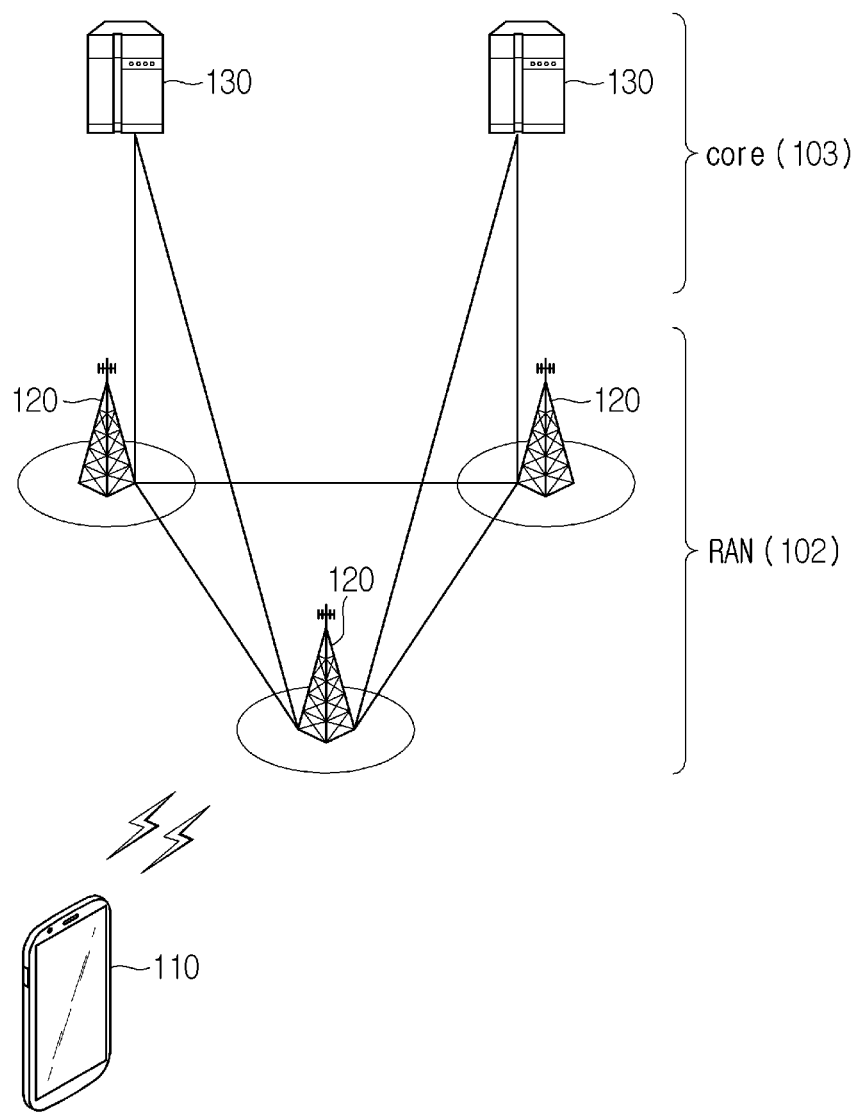
FIG. 1 illustrates the structure of a wireless communication system according to an embodiment of the present disclosure.

The following embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment.

In the description of the drawings, procedures or steps which render the scope of the present invention unnecessarily ambiguous will be omitted and procedures or steps which can be understood by those skilled in the art will be omitted.

In the entire specification, when a certain portion "comprises" or "includes" a certain component, this indicates that the other components are not excluded, but may be further included unless specially described. The terms "unit", "-or/er" and "module" described in the specification indicate a unit for processing at least one function or operation, which may be implemented by hardware, software and a combination thereof. In addition, "a or an", "one", "the" and similar related words may be used as the sense of including both a singular representation and a plural representation unless it is indicated in the context describing the present specification (especially in the context of the following claims) to be different from this specification or is clearly contradicted by the context.

In the present specification, "A or B" may mean "only A", "only B" or "both A and B". In other words, in the present specification, "A or B" may be interpreted as "A and/or B". For example, in the present specification, "A, B or C" may mean "only A", "only B", "only C" or "any combination of A, B and C".

A slash (/) or comma used in the present specification may mean "and/or". For example, "A/B" may mean "A and/or B". Therefore, "A/B" may mean "only A", "only B" or "both A and B". For example, "A, B, C" may mean "A, B or C".

In the present specification, "at least one of A and B" may mean "only A", "only B" or "both A and B". In addition, in the specification, "at least one of A or B" or "at least one of A and/or B" may be interpreted as being the same as "at least one of A and B".

In addition, in the present specification, "at least one of A, B and C" may mean "only A", "only B", "only C" or "any combination of A, B and C". In addition, in the specification, "at least one of A, B or C" or "at least one of A, B and/or C" may be interpreted as being the same as "at least one of A, B and C".

In addition, parentheses used in the present specification may mean "for example". Specifically, when "control information (PDCCH)" is described, "PDCCH" may be proposed as an example of "control information". In other words, "control information" of the present specification is not limited to "PDCCH" and "PDCCH" may be proposed as an example of "control information". In addition, even when "control information (that is, PDCCH)" is described, "PDCCH" may be proposed as an example of "control information".

In the following description, "when, if or in case of" may be replaced with "based on".

In this specification, technical features individually described in one drawing may be implemented individually or simultaneously.

In this specification, a higher layer parameter may be set for a user equipment (UE), preset or predefined. For example, a base station or a network may transmit a higher layer parameter to a UE. For example, the higher layer parameter may be transmitted through radio resource control (RRC) signaling or medium access control (MAC) signaling.

The following technology can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc. IEEE 802.16m is an evolution of IEEE 802.16e and provides backward compatibility with a system based on IEEE 802.16e. UTRA is a part of Universal Mobile Telecommunications System (UMTS). Third generation partnership project (3GPP) long term evolution (LTE) is a part of Evolved UMTS (E-UMTS) using E-UTRA, adopting OFDMA for DL and SC-FDMA for UL. LTE-Advanced (LTE-A) is an evolution of 3GPP LTE.

5G NR is subsequent technology of LTE-A and is a new clean-state mobile communication system having features such as high performance, low latency and high availability. 5G NR may utilize all available spectral resources such as low frequency bands of less than 1 GHz to intermediate frequency bands of 1 GHz to 10 GHz or high frequency (millimeter) bands of 24 GHz or higher.

5G NR is focused upon in order to clarify the description but the technical idea of an embodiment of the present disclosure is not limited thereto.

For terms and technologies which are not specifically described among terms and technologies used in this specification, reference may be made to the wireless communication standard document published before application of this specification. For example, 3GPP TS36.XXX, 3GPP TS37.XXX and 3GPP38.XXX documents may be referenced.

Communication System Applicable to the Present Disclosure

FIG. 1 illustrates the structure of a wireless communication system according to an embodiment of the present disclosure. The embodiment of FIG. 1 may be combined with various embodiments of the present disclosure.

Referring to FIG. 1, the wireless communication system includes a radio access network (RAN) 102 and a core network 103. The RAN 102 includes a base station 120 for providing a terminal 110 with a control plane and a user plane. The terminal 110 may be fixed or mobile and may be referred to as the other term such as user equipment (UE), mobile station (MS), subscriber station (SS), mobile subscriber station (MSS), mobile terminal or advanced mobile station (AMS), wireless device or the like. The base station 120 is a node for providing a radio access service to the terminal 110 and may be referred to as the other term such as a fixed station, a Node B, an eNode B (eNB), a gNode B (gNB), a ng-eNB, an advanced base station (ABS) or an access point (AP), a base transceiver system (BTS), or the like. The core network 103 includes a core network entity 130. The core network entity 103 may be variously defined according to the function and may be referred to as the other term such as a core node, a network node, a network equipment or the like.

The structural elements of the system may be referred to differently according to the applied system standard. In the case of LTE or LTE-A, the RAN 102 is an Evolved-UMTS Terrestrial Radio Access Network (E-UTRAN), and the core network 103 may be referred to as an evolved packet core (EPC). In this case, the core network 103 includes a mobility management entity (MME), a serving gateway (S-GW) and a packet data network-gateway (P-GW). The MME has access information of the terminal or information on the capabilities of the terminal, and such information is mainly used for mobility management of the terminal. The S-GW is a gateway with an E-UTRAN as an end point, and the P-GW is a gateway having a packet data network (PDN) as an end point.

In the case of the 5G NR standard, the RAN 102 is a NG-RAN, and the core network 103 may be referred to as a 5G core (5GC). In this case, the core network 103 includes an access and mobility management function (AMF), a user plane function (UPF), and a session management function (SMF). The AMF provides a function for access and mobility management of a terminal unit, the UPF performs a function for mutually transferring a data unit between a higher layer network and the RAN 102, and the SMF provides a session management function.

The base stations 120 may be connected to each other through an Xn interface. The base station 120 may be connected to the core network 103 through an NG interface. More specifically, the base station 120 may be connected to the AMF through an NG-C interface, and may be connected to the UPF through an NG-U interface.

Figure 2:
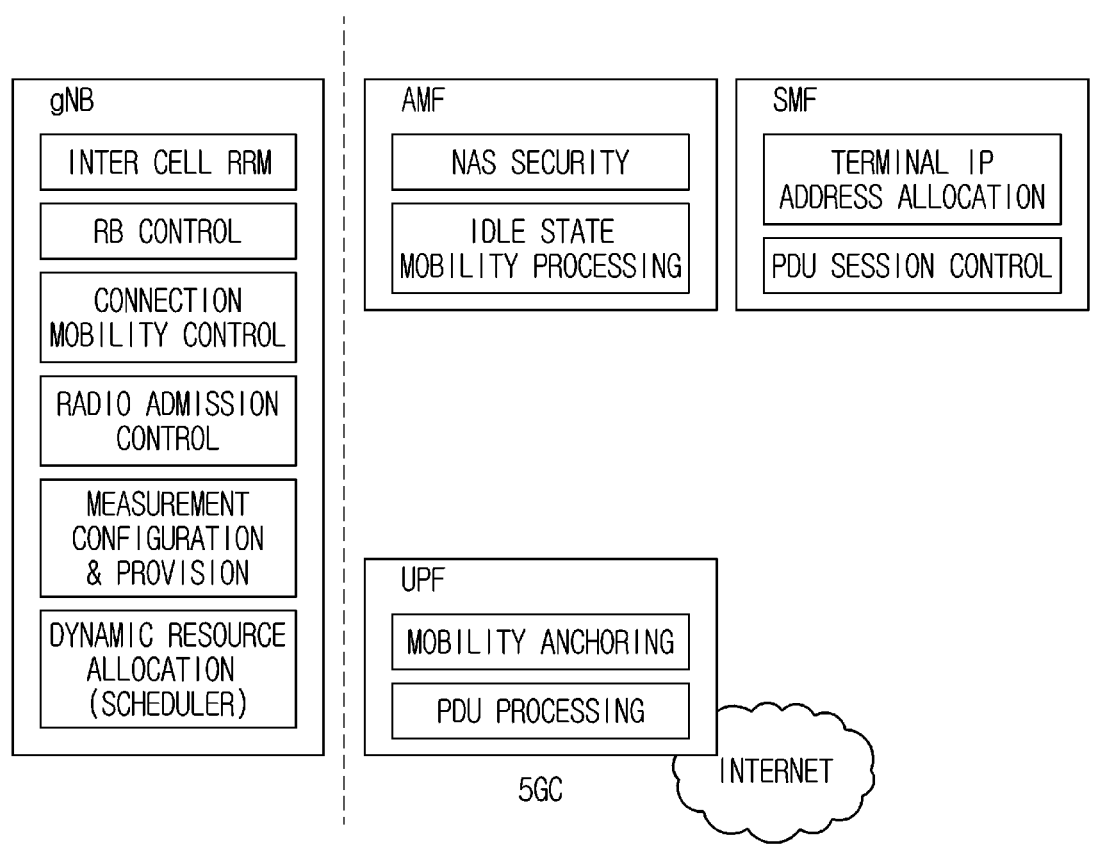
FIG. 2 illustrates functional division between NG-RAN and 5GC according to an embodiment of the present disclosure.

FIG. 2 illustrates functional division between NG-RAN and 5GC according to an embodiment of the present disclosure. The embodiment of FIG. 2 may be combined with various embodiments of the present disclosure.

Referring to FIG. 2, a gNB may provide functions such as inter cell radio resource management (RRM), radio bearer control, connection mobility control, radio admission control, measurement configuration & provision, dynamic resource allocation or the like. The AMF may provide functions such as non access stratum (NAS) security and idle state mobility processing. The UPF may provide functions such as mobility anchoring, protocol data unit (PDU) processing or the like. The SMF may provide functions such as terminal Internet protocol (IP) address allocation, PDU session control or the like.

Radio interface protocol layers between a terminal and a network may be classified into Layer 1 (L1), Layer 2 (L2) and Layer 3 (L3) based on the three sublayers of the open system interconnection (OSI) reference model that is well known in the communication system. Among them, a physical layer belonging to Layer 1 provides an information transfer service using a physical channel and a radio resource control (RRC) layer located on Layer 3 is responsible for controlling radio resources between a terminal and a network. To this end, the RRC layer enables exchange of an RRC message between a terminal and a network.

Figure 3A:
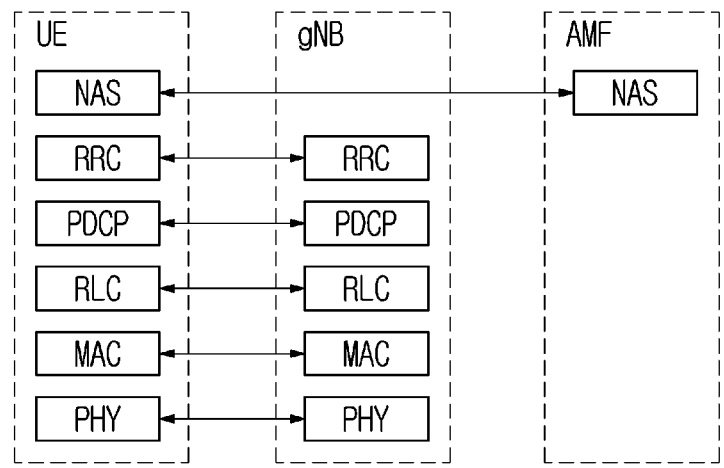
FIGS. 3A and 3B illustrate radio protocol architectures according to an embodiment of the present disclosure.
Figure 3B:
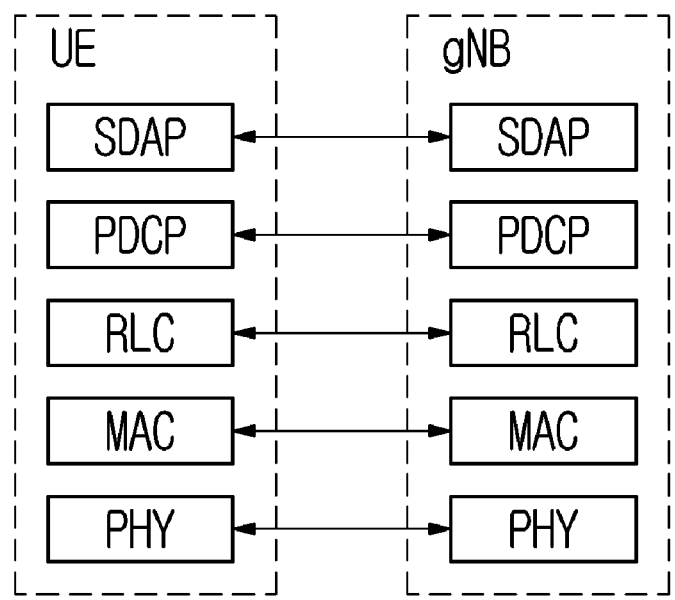

FIGS. 3A and 3B illustrate protocol architectures according to an embodiment of the present disclosure. The embodiment of FIGS. 3A and 3B may be combined with various embodiments of the present disclosure. Specifically, FIG. 3A shows a radio protocol structure for a user plane and FIG. 3B shows a radio protocol structure for a control plane. The user plane is a protocol stack for user data transmission and the control plane is a protocol stack for control signal transmission.

Referring to FIGS. 3A and 3B, a physical layer provides an information transfer service to a higher layer using a physical channel. The physical layer is connected to a Medium Access Control (MAC) layer located on a higher layer via a transport channel. Data is transported between the MAC layer and the physical layer via the transport channel. The transport channel is classified according to how data is transmitted via a radio interface with what characteristics.

Data is also transported between different physical layers, that is, the physical layers of a transmitter and a receiver, via a physical channel. The physical channel may be modulated using an Orthogonal Frequency Division Multiple Access (OFDMA) scheme, and uses a time and a frequency as radio resources.

A Medium Access Control (MAC) layer provides a service to a Radio Link Control (RLC) layer of a higher layer via a logical channel. The MAC layer provides a mapping function from a plurality of logical channel to a plurality of transport channels. In addition, the MAC layer provides a logical channel multiplexing function by mapping from a plurality of logical channels to a single transport channel. A MAC sublayer provides a data transmission service on a logical channel.

A radio link control (RLC) layer performs concatenation, segmentation and reassembly of an RLC service data unit (SDU). In order to ensure a variety of quality of service (QoS) required by a radio bearer (RB), the RLC layer provides three operation modes such as a transparent mode (TM), an unacknowledged mode (UM) and an acknowledged mode (AM). AM RLC provides error correction through automatic repeat request (ARQ).

A Radio Resource Control (RRC) layer is defined only in the control plane. The RRC layer is responsible for control of logical, transport, and physical channels in association with configuration, re-configuration, and release of Radio Bearers (RBs). The RB means a logical path provided by Layer 1 (the physical layer or the PHY layer) and Layer 2 (the MAC layer, the RLC layer or the packet data convergence protocol (PDCP) layer) for data transfer between a UE and a network.

The functions of the PDCP layer in the user plane include user data transfer, header compression and ciphering. The functions of the PDCP layer in the control plane include control plane data transfer and ciphering/integrity protection.

A service data adaptation protocol (SDAP) layer is defined only in the user plane. The SDAP layer performs mapping between QoS flow and data radio bearer and QoS flow identifier (ID) marking in uplink and downlink packets.

Configuring an RB means a process of defining characteristics of a radio protocol layer and channel to provide a specific service and setting specific parameters and operation methods. The RB may be subdivided into a signaling radio bearer (SRB) and a data radio bearer (DRB). The SRB is used as a path for transmitting an RRC message in the control plane and the DRB is used as a path for transmitting user data in the user plane.

When RRC connection is established between the RRC layer of a terminal and the RRC layer of the base station, the UE may be in an RRC_CONNECTED mode, and, otherwise, the UE may be in an RRC_IDLE mode. In the case of NR, an RRC_INACTIVE state is further defined, and the UE in the RRC_INACTIVE mode may maintain connection with the core network but release connection with the base station.

Examples of a downlink transmission channel for transmitting data from a network to a terminal include a broadcast channel (BCH) for transmitting system information and a downlink shared channel (SCH) for transmitting user traffic or a control message. A control message or traffic of a downlink multicast or broadcast service may be transmitted via a downlink SCH or via a separate downlink multicast channel (MCH). Meanwhile, examples of an uplink transmission channel for transmitting data from a terminal to a network include a random access channel (RACH) for transmitting an initial control message and an uplink shared channel (SCH) for transmitting user traffic or a control message.

Examples of a logical channel located above a transport channel and mapped to the transport channel include a Broadcast Control Channel (BCCH), a Paging Control Channel (PCCH), a Common Control Channel (CCCH), a Multicast Control Channel (MCCH), a Multicast Traffic Channel (MTCH) and the like.

The physical channel consists of a plurality of OFDM symbols in the time domain and a plurality of subcarriers in the frequency domain. One subframe consists of a plurality of OFDM symbols in the time domain. The resource block is a resource allocation unit and consists of a plurality of OFDM symbols and a plurality of subcarriers. In addition, each subframe may use specific subcarriers of specific OFDM symbols (e.g., a first OFDM symbol) of the corresponding subframe for a physical downlink control channel (PDCCH), that is, an L1/L2 control channel. A Transmission Time Interval (TTI) is a unit time for subframe transmission.

Radio Resource Structure

Figure 4:
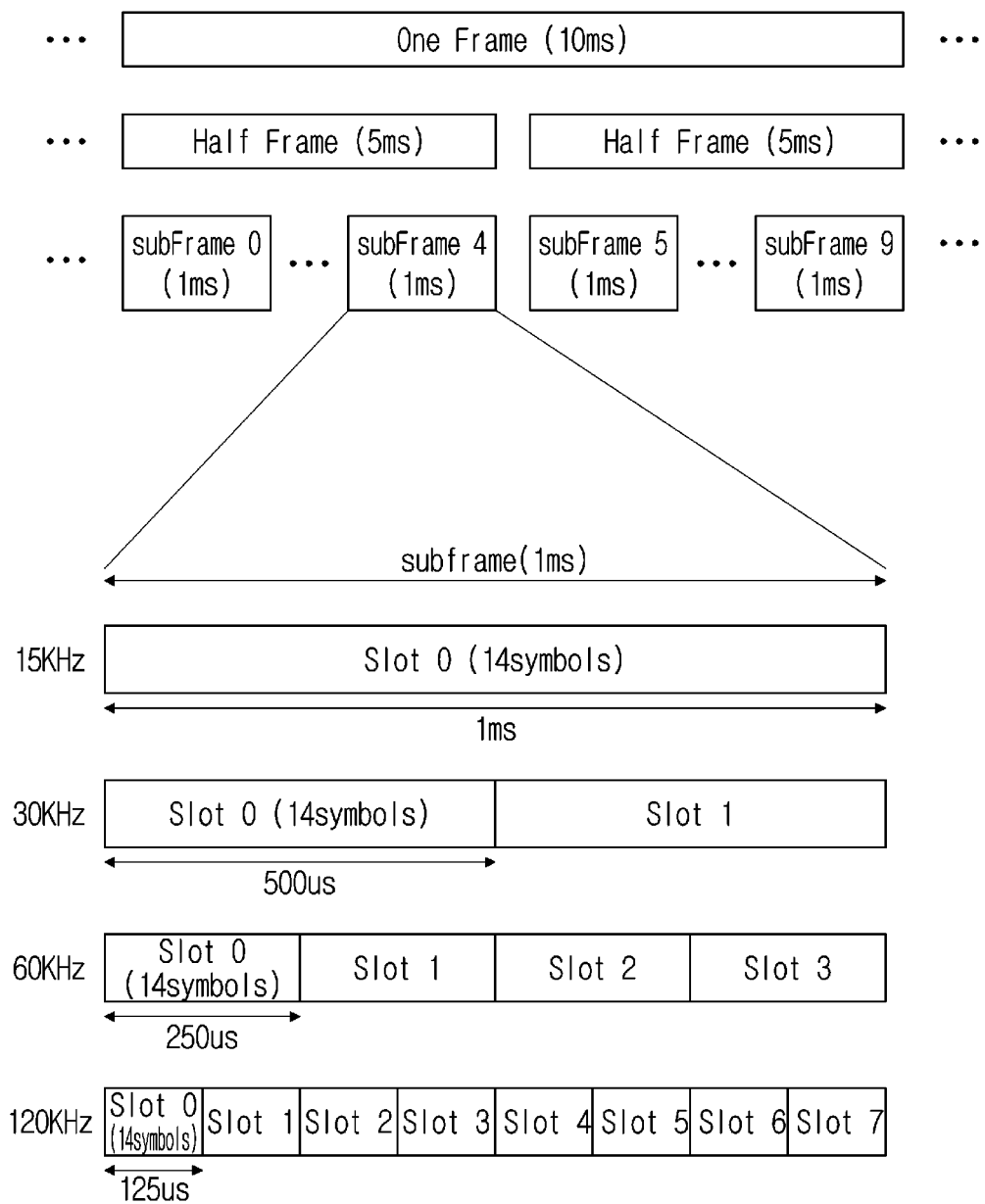
FIG. 4 illustrates the structure of a radio frame of NR according to an embodiment of the present disclosure.

FIG. 4 illustrates the structure of a radio frame of NR according to an embodiment of the present disclosure. The embodiment of FIG. 4 may be combined with various embodiments of the present disclosure.

Referring to FIG. 4, in NR, a radio frame may be used in uplink and downlink transmission. A radio frame has a length of 10 ms and may be defined as two 5-ms half-frames (HFs). The half-frame includes five 1-ms subframes (SFs). The subframe may be divided into one or more slots and the number of slots in the subframe may be determined according to a subscriber spacing (SCS). Each slot may include 12 or 14 OFDM(A) symbols according to a cyclic prefix (CP).

When a normal CP is used, each slot may include 14 symbols. When an extended CP is used, each slot may include 12 symbols. Here, the symbol may include an OFDM symbol (or a CP-OFDM symbol) and an SC-FDMA (Single Carrier-FDMA) symbol (or a DFT-s-OFDM (Discrete Fourier Transform-spread-OFDM) symbol).

When the normal CP is used, the number $N^{slot}_{symb}$ of symbols per slot, the number $N^{frame,\mu}_{slot}$ of slots per frame and the number $N^{subframe,\mu}_{slot}$ of slots per subframe may vary according to the SCS configuration (u). For example, SCS (=15*2$^\mu$), $N^{slot}_{symb}$, $N^{frame,\mu}_{slot}$, and $N^{subframe,\mu}_{slot}$ may be 15 KHz, 14, 10 and 1 in the case of u=0, may be 30 KHz, 14, 20 and 2 in the case of u=1, may be 60 KHz, 14, 40, 4 in the case of u=2, may be 120 KHz, 14, 80 and 8 in the case of u=3, and may be 240 KHz, 14, 160, 16 in the case of u=4. In contrast, when the extended CP is used, SCS(=15*2$^\mu$), $N^{slot}_{symb}$, $N^{frame,\mu}_{slot}$, and $N^{subframe,\mu}_{slot}$ may be 60 KHz, 12, 40 and 4 in the case of u=2. In the NR system, an OFDM(A) numerology (e.g., SCS, CP length, etc.) may be differently set among a plurality of cells merged into one terminal. Accordingly, the (absolute time) duration of time resources (e.g., a subframe, a slot or a TTI) (for convenience, collectively referred to as a time unit (TU)) consisting the same number of symbols may be differently set between merged cells.

In NR, a plurality of numerologies or SCS supporting various 5G services may be supported. For example, a wide area in typical cellular bands may be supported when SCS is 15 kHz, and dense-urban, lower latency and wider carrier bandwidth may be supported when SCS is 30 kHz/60 kHz. When SCS is 60 kHz or higher, bandwidth greater than 24.25 GHz may be supported in order to overcome phase noise.

The NR frequency band may be defined as two types of frequency ranges. The two types of frequency ranges may be FR1 and FR2. The numerical value of the frequency range may be changed and, for example, frequency ranges corresponding to FR1 and FR2 may be 450 MHz to 6000 MHz and 24250 MHz to 52600 MHz. In addition, the supported SCS may be 15, 30 and 60 kHz in the case of FR1, and may be 60, 120 and 240 kHz in the case of FR2. Among the frequency ranges used in the NR system, FR1 may mean "sub 6 GHz range", and FR2 may mean "above 6 GHz range" and may be called as millimeter wave (mmW).

As described above, the numerical value of the frequency range of the NR system may be changed. For example, as compared to the above-described example of the frequency range, FR1 may be defined as including a band of 410 MHz to 7125 MHz. That is, FR1 may include a frequency band of 6 GHz (or 5850, 5900, 5925 MHz, etc.) or higher. For example, a frequency band of 6 GHz (or 5850, 5900, 5925 MHz, etc.) included in FR1 may include an unlicensed band. The unlicensed band may be used for various purposes and may be used, for example, for vehicle communication (e.g., autonomous driving).

Figure 5:
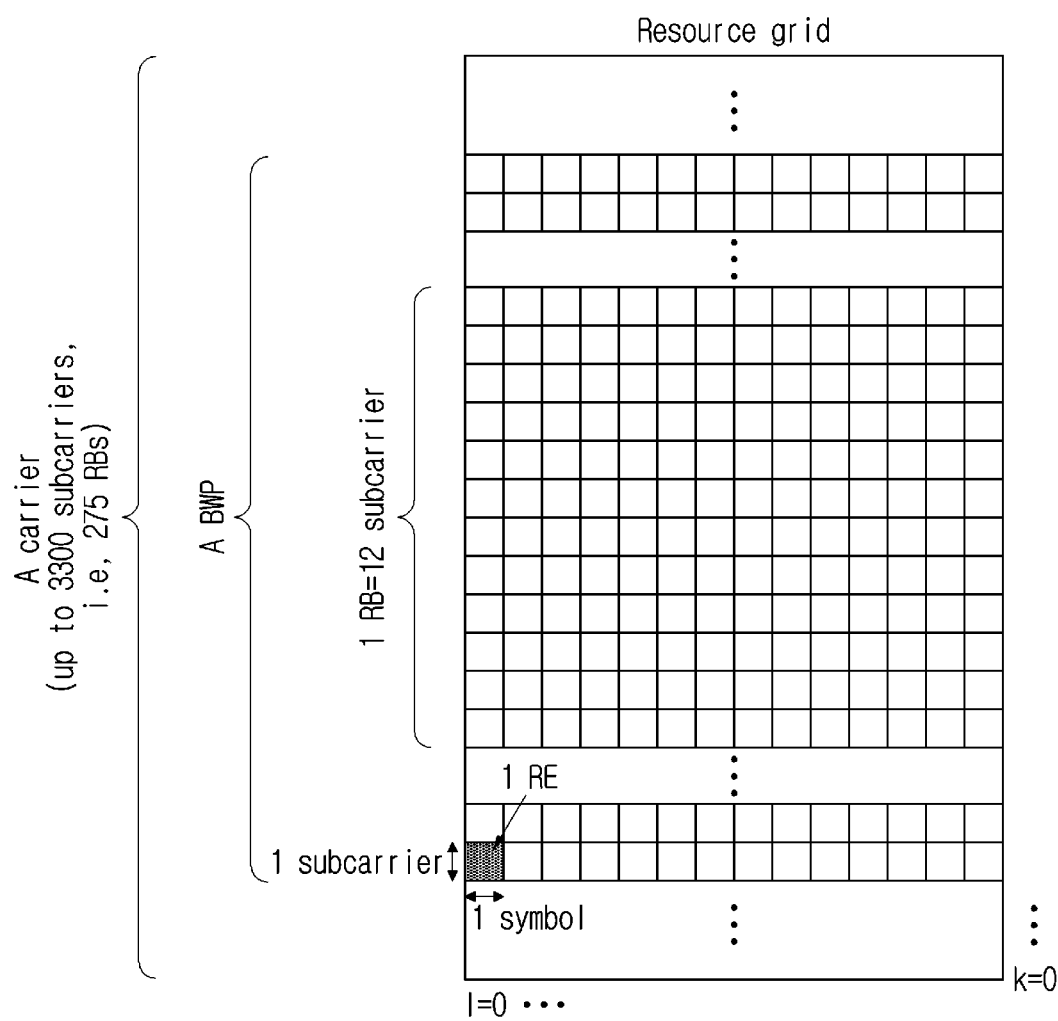
FIG. 5 illustrates a slot structure of an NR frame according to an embodiment of the present disclosure.

FIG. 5 illustrates a slot structure of an NR frame according to an embodiment of the present disclosure. The embodiment of FIG. 5 may be combined with various embodiments of the present disclosure.

Referring to FIG. 5, a slot includes a plurality of symbols in the time domain. For example, one slot includes 14 symbols in the case of the normal CP and may include 12 symbols in the case of the extended CP. Alternatively, one slot may include 7 symbols in the case of the normal CP and may include 6 symbols in the case of the extended CP.

A carrier includes a plurality of subcarriers in the frequency domain. A resource block (RB) may be defined as a plurality (e.g., 12) of consecutive subcarriers in the frequency domain. A bandwidth part (BWP) may be defined as a plurality of consecutive (physical) resource blocks ((P) RBs) in the frequency domain, and correspond to one numerology (e.g., SCS, CP length, etc.). The carrier may include a maximum of N (e.g., 5) BWPs. Data communication may be performed through an activated BWP. Each element may be referred to as a resource element (RE) in the resource grid and one complex symbol may be mapped.

Meanwhile, a radio interface between terminals and a radio interface between a terminal and a network may consist of Layer L1, Layer L2 and Layer L3. In various embodiments of the present disclosure, Layer L1 may mean a physical layer. In addition, for example, Layer L2 may mean at least one of a MAC layer, an RLC layer, a PDCP layer or an SDAP layer. In addition, for example, Layer L3 may mean an RRC layer.

In a radio access system, a terminal receives information from a base station through a downlink and transmit information to the base station through an uplink. Information transmitted and received by the base station and the terminal may include general data information and a variety of control information, and various physical channels are present according to the type/usage of the transmitted/received information.

Figure 6:
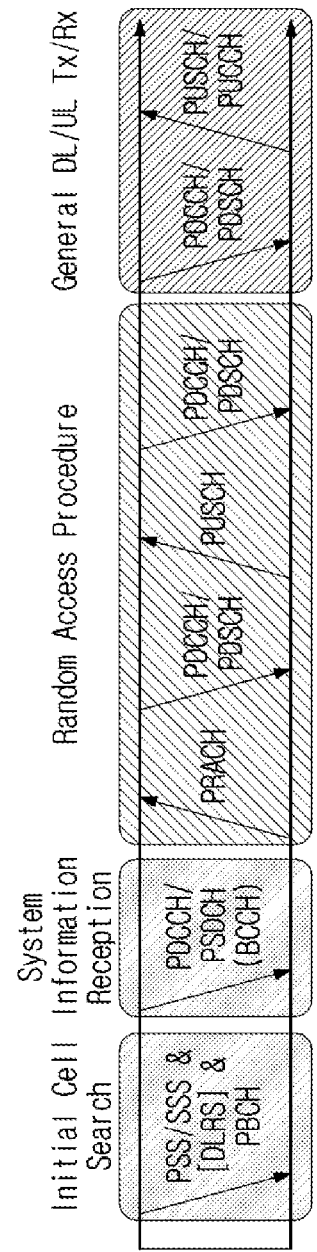
FIG. 6 illustrates signal transmission through physical channels according to an embodiment of the present disclosure.

FIG. 6 illustrates signal transmission through physical channels according to an embodiment of the present disclosure.

Referring to FIG. 6, when a UE is powered on or enters a new cell, the UE performs an initial cell search operation such as synchronization with a base station. Specifically, the UE may receive a primary synchronization channel (P-SCH) and a secondary synchronization channel (S-SCH) from the base station, synchronize with the eNB and acquire information such as a cell ID. Thereafter, the UE may receive a physical broadcast channel (PBCH) signal from the base station and acquire inter cell broadcast information. Meanwhile, the UE may receive a downlink reference signal (DL RS) and confirm a downlink channel state in the initial cell search step.

The UE, which has completed initial cell search, performs system information reception operation. The UE may acquire more detailed system information, by receiving a physical downlink control channel (PDCCH) and a physical downlink control channel according to the PDCCH information.

Thereafter, the UE may perform a random access procedure in order to complete access to the base station. To this end, the UE may transmit a preamble through a physical random access channel (PRACH) and receive a random access response (RAR) for the preamble through a PDCCH and a PDSCH corresponding thereto. The UE may transmit a physical uplink shared channel (PUSCH) using scheduling information in the RAR and perform a contention resolution procedure such as reception of a PDCCH signal and a PDSCH signal corresponding thereto.

Meanwhile, the random access procedure is performed in two steps, preamble transmission and PUSCH transmission of the UE are performed as one operation, and RAR transmission and PDSCH transmission of the base station may be performed as one operation.

Thereafter, the UE may perform reception of a PDCCH signal and/or a PDSCH signal or may perform reception of a PUSCH signal and/or transmission of a PUCCH signal, as a general uplink/downlink signal transmission procedure.

Control information transmitted from the UE to the base station is referred to as uplink control information (UCI). The UCI includes Hybrid Automatic Repeat and reQuest (HARQ) Acknowledgement/Negative-Acknowledgement (ACK/NACK), Scheduling Request (SR), Channel Quality Indication (CQI), Precoding Matrix Indication (PMI), Rank Indication (RI) information, etc. In general, the UCI is periodically transmitted through a PUCCH, but may be transmitted through a PUSCH when control information and data need to be simultaneously transmitted. In addition, the UE may aperiodically transmit the UCI through the PUSCH according to the request/instruction of a network.

Figure 7:
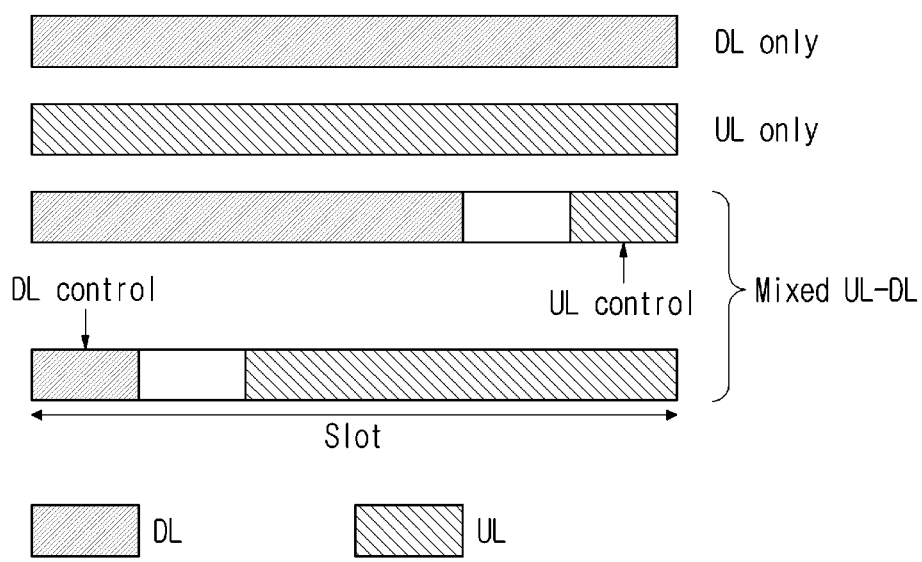
FIG. 7 illustrates an acknowledge (ACK)/negative ACK (HACK) transmission procedure according to an embodiment of the present disclosure.

FIG. 7 illustrates an ACK/NACK transmission procedure according to an embodiment of the present disclosure.

Referring to FIG. 7, a UE may detect a PDCCH in slot #n. Here, the PDCCH includes downlink scheduling information (e.g., DCI format 1_0 and 1_1), and PDCCH indicates DL assignment-to-PDSCH offset (K0) and PDSCH-HARQ-ACK reporting offset (K1). For example, DCI format 1_0 and 1_1 may include the following information.

Frequency domain resource assignment: This indicates an RB set assigned to a PDSCH.

Time domain resource assignment: K0, This indicates the start position (e.g., OFDM symbol index) and length (e.g., the number of OFDM symbols) of a PDSCH in a slot.

PDSCH-to-HARQ feedback timing indicator: This indicates K1.

Thereafter, the UE may receive a PDSCH in slot #(n+K0) according to scheduling information related to slot #n and then transmit UCI through a PUCCH in slot #(n+K1). Here, the UCI includes HARQ-ACK response to the PDSCH. When the PDSCH is configured to transmit a maximum of 1 TB, the HARQ-ACK response may consist of 1 bit. When the PDSCH is configured to transmit a maximum of two TBs, the HARQ-ACK response may consist of 2 bits when spatial bundling is not configured and may consist of 1 bit when spatial bundling is configured. When a HARQ-ACK transmission time point for a plurality of PDSCHs is designated as slot #(n+K1), the UCI transmitted in slot #(n+K1) includes a HARQ-ACK response to the plurality of PDSCHs.

Detailed Embodiments of the Present Invention

Hereinafter is described a method for exchanging, by a terminal and a base station, a signal based on a rate splitting multiple access (RSMA) in a new communication system. As an example, a RSMA scheme may be a method where parts of messages transmitted to each user are bound in a form of common message to be transmitted to every user and the remaining private messages are restored through information obtained based on decoding of the common message. Accordingly, a common message needs to include configuration information on a private message. Also, a mechanism of determining a rate for a common message and a private message may be necessary, which will be described below.

As an example, a new communication system (new radio (NR)) has been introduced to the existing LET communication, and communication may be performed based thereon. The new communication system (NR) may provide an interface for performing communication via beamforming based on mmWave. Also, as an example, the new communication system may provide an interface for performing communication, which improves throughput based on massive multi-input multi-output (MIMO).

Herein, the new communication system may perform communication based on a non-orthogonal multiple access (NOMA) scheme. In the existing communication system (e.g. LTE), communication could be performed based on orthogonal frequency division multiplexing (OFDM). That is, in the existing communication system, transmission and reception of data could be performed by dividing orthogonal frequencies and using multiple carriers. However, OFDM may have a limitation in the new communication system requiring high throughput and low latency. Accordingly, it is possible to consider communication via NOMA schemes that improve performance by intentionally violating the orthogonality of frequency. Herein, the NOMA schemes may be classified into NOMA schemes applied to code domain and NOMA schemes applied to power domain.

As an example, the code-domain NOMA series may be based on the existing code division multiple access (CDMA)

technology. The code-domain NOMA series may consider at least one of an interleave-division multiple access (IDMA) scheme, a low density spreading aided CDMA (LD-SCDMA) scheme, a multi user shared access (MUSA) scheme, a resource spread multiple access (RSMA) scheme, and a sparse code multiple access (SCMA) scheme. That is, the code-domain NOMA series may be a technology of multiplexing users based on a generalized code word.

On the other hand, the power-domain NOMA may be a technology of multiplexing users through powers with different sizes based on power domain multiple access (PDMA). As the power-domain NOMA technology multiplexes a signal in a power domain by using power splitting, multiple users may use a same frequency domain at a same time. Accordingly, when communication is performed based on NOMA, a base station may generate and transmit a transmission signal by performing data superposition coding for multiple users, and a terminal may distinguish and receive a signal by using successive interference cancellation (SIC).

Figure 8:
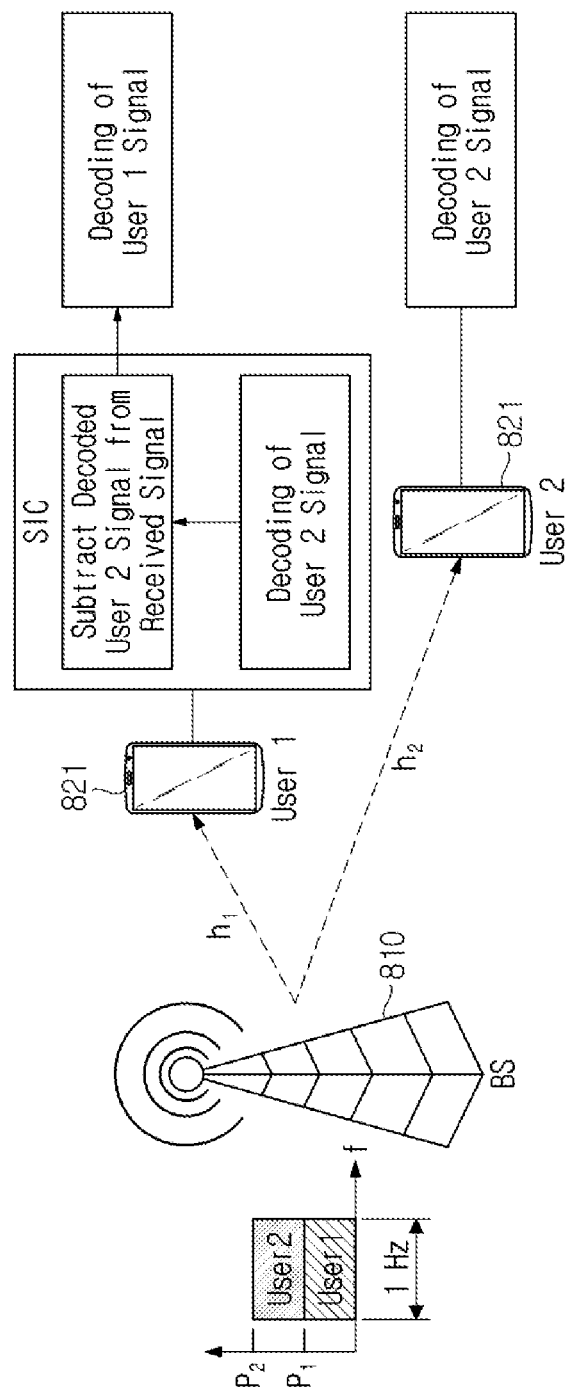
FIG. 8 is a view illustrating a method for transmitting, by a base station, a signal simultaneously to multiple terminals based on a NOMA scheme according to an embodiment of the present disclosure.

As an example, FIG. 8 is a view illustrating a method for transmitting, by a base station, a signal simultaneously to multiple terminals based on a NOMA scheme according to the present disclosure. Referring to FIG. 8, for data transmitted to a terminal 1 (user 1) 821 and a terminal 2 (user 2) 822, a base station 810 may perform transmission at a same time and in a same frequency band based on a NOMA scheme. Herein, data for the terminal 1 821 and data for the terminal 2 822 may be distinguished from each other based on power splitting. As an example, the data for the terminal 2 822 may be transmitted at a high power, and the data for the terminal 1 821 may be transmitted at a low power. Herein, the terminal 2 822 may decode its data, which is transmitted at the high power, in a received signal. In addition, the terminal 1 821 may decode the data of the terminal 2 822, which is transmitted at the high power, and the ultimate data of the terminal 1 821 may be obtained based on a SIC scheme that subtracts a signal of the terminal 2 822 from the received signal.

Specifically, with respect to power splitting, the signal of the terminal 2 822 may be larger than the signal of the terminal 1 821. Accordingly, the terminal 1 821 may decode the signal of the terminal 2 822 first. Next, the terminal 1 821 may regenerate a frequency signal by using the signal of the terminal 2 822. The terminal 1 821 may restore its signal frequency waveform by subtracting the regenerated frequency signal from the originally received signal and may receive data by decoding the signal frequency waveform. On the other hand, the terminal 2 822 may easily decode a signal since the signal of the terminal 1 821 is relatively small in an overlapping signal, in which the data of the terminal 1 821 is mixed, and is reduced to a noise level due to attenuation effect according to distance. As an example, in the equation 4 below, the channel gains of each terminal may be $|h_1|^2$ and $|h_2|^2$, and the power splitting of each terminal may be $P_1$ and $P_2$. Here, noises at each terminal may be $N_{0,1}$ and $N_{0,2}$, and the channel capacity of each terminal may be calculated by Equation 4 below.

$$R_1 = \log_2\left(1 + \frac{P_1|h_1|^2}{N_{0,1}}\right), R_2 = \log_2\left(1 + \frac{P_2|h_2|^2}{P_1|h_2|^2 + N_{0,2}}\right) \quad \text{[Equation 4]}$$

That is, NOMA may be a scheme for enhancing frequency resource efficiency by breaking the orthogonality of the existing multiple access scheme and enabling two or more users to perform transmission in a same frequency band. Thus, NOMA may have better frequency efficiency than the orthogonal multiple access (OMA) technology. However, as described above, when terminals are distinguished based on power splitting, determining a successive interference cancellation (SIC) order of multiple terminals may be important, and a structure of a receiver may become complex accordingly. Further, as an example, when the number of terminals thus distinguished increases, the number of signals of the terminals to be successively subtracted also increases, which makes it difficult to restore signals when error propagation occurs.

In consideration of the above disadvantages, a new communication system may perform communication based on a RSMA scheme. As an example, various devices (e.g., high-end smart phones, low-end machine type communication devices) may be mixed in the new communication system. Also, based on various applications, a base station needs to perform communication with terminals having different types of channel state information. Herein, a RSMA scheme may be a multiple user access technology that decodes a part of interference and processes other part of interference as noise. Thus, the RSMA scheme may support a lot of terminals in various channel environments and be robust to channel information.

As an example, a space division multiple access (SDMA) scheme may be a method of avoiding the interference of other terminals through space division. Herein, a transmitting end may avoid signal interference from other users through space division using beamforming. In addition, as the NOMA scheme directly cancels interference from another terminal and restores a signal, there may be a difference in restoring a signal in a multi-user environment. As an example, the RSMA scheme may combine the NOMA scheme and the SDMA scheme to overcome the disadvantages of each of the schemes.

Figure 9:
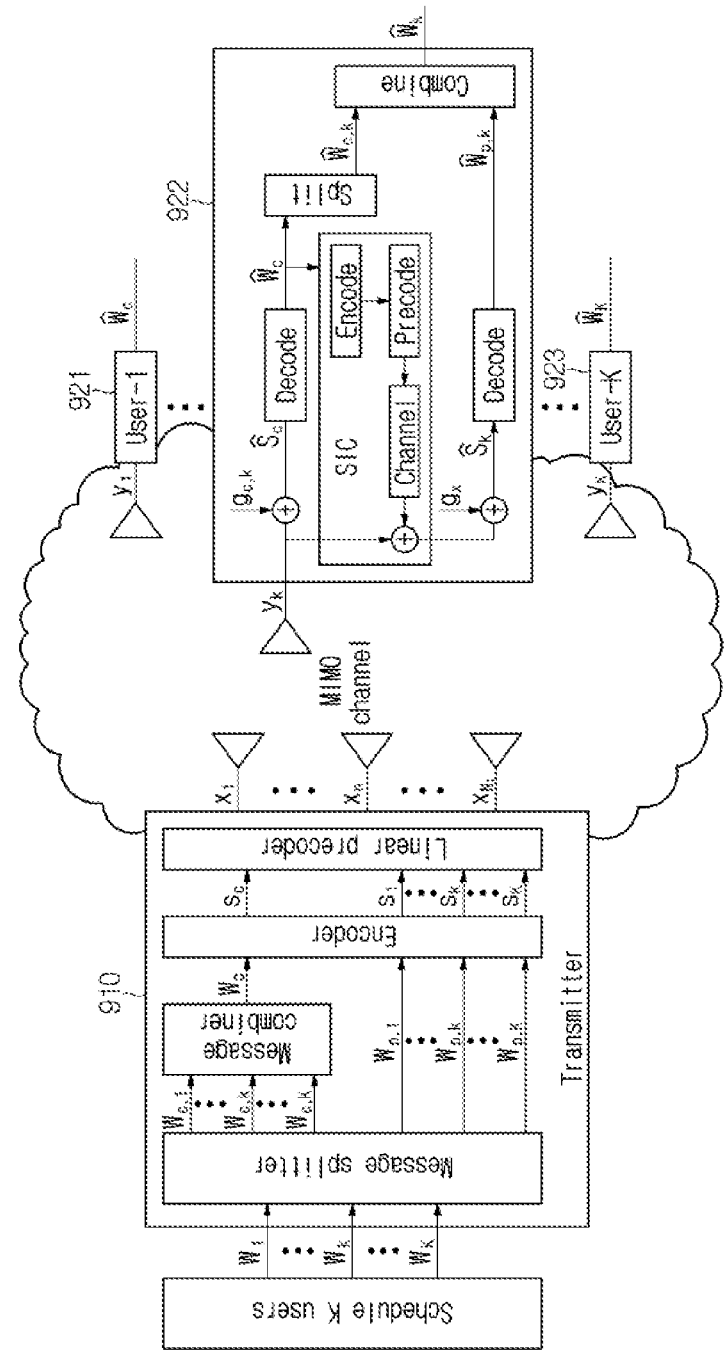
FIG. 9 is a view illustrating a RSMA transmission and reception structure according to an embodiment of the present disclosure.

Specifically, FIG. 9 is a view illustrating a RSMA transmission and reception structure according to the present disclosure. Referring to FIG. 9, a base station 910 may transmit data to K terminals. Herein, messages to each of the K terminals may be $W_1$ to $W_k$. Herein, the base station may distinguish the messages for each terminal into common messages and private messages through a message splitter. Herein, the common messages for the each terminal may be generated as a single common message $W_c$ through a message combiner. In addition, the remaining private messages for the each terminal may be $W_{p,1}$ to $W_{p,k}$. That is, the base station 910 may generate K+1 streams from K messages.

Herein, encoding of the common message $W_c$ and encoding of $W_{p,1}$ to $W_{p,k}$ respectively may be performed independently. Next, symbol $S_k$ thus generated may be transmitted through $N_t$ transmission antennas, pass a channel and then be transmitted to each terminal. Herein, each of the terminals 921, 922, 923 may receive a symbol $\hat{S}_c$ for the common message first. Each of the terminals 921, 922, 923 may decode ($\hat{W}_c$) corresponding to the common message from $\hat{S}_c$, which is received first. Next, each of the terminals 921, 922, 923 may remove a common signal component. That is, it is possible to remove a common signal component that a reception antenna receives based on encoding, which is performed at the base station, and a wireless channel. $\widehat{W_{p,k}}$ may be obtained by decoding a private message component for each of the terminals 921, 922, 923, which belongs to a signal left behind after removing the common signal component. Next, each of the terminals 921, 922, 923 may obtain an estimate value $\hat{W}_k$ of the transmitted signal by combining the private message component and the common message component.

For a concrete example, when $W_1=(a_1, a_2, a_3)$, $W_2=(b_1, b_2, b_3)$ and $W_3=(c_1, c_2, c_3, c_4)$, it may be the case that $W_{c,1}=(a_1, a_2)$, $W_{c,2}=(b_1)$, and $W_{c,3}=(c_1, c_2)$. Herein, the common message $W_c$ may ($W_{c,1}$, $W_{c,2}$, $W_{c,3}$), that is, $(a_1, a_2, b_1, c_1, c_2)$, and each of the remain pieces of information may be configured as private messages. In other words, from data for K terminals, partial data is extracted to construct a common message, and each part of the remaining data may be constructed as private messages. Accordingly, K+1 streams may be generated from K messages, and transmission may be performed based thereon.

That is, the RSMA scheme may generate a common message from parts of the messages to be transmitted to each terminal and transmit the common message and generate separately the remaining private messages and transmit the private messages to each terminal. Herein, each of the terminals 921, 922, 923 may restore information corresponding to its message assigned in the common message by decoding a part of the common message. Next, each of the terminals 921, 922, 923 may restore an entire message by restoring private messages. In consideration of the above description, a mechanism for defining information necessary to configure a common message and a private message and for rate splitting may be required, which will be described below.

As an example, in the case of the RSMA scheme, a part of a message transmitted to each terminal may be combined and transmitted in a form of common message. Herein, it is necessary for each terminal to recognize common message configuration information before decoding the common message. To this aim, a base station may signal the common message configuration information to each terminal in advance. As an example, the common message configuration information may include the following information of Table 2. Specifically, the common message configuration information may include information on a total number of bits. In addition, the common message configuration information may include information on a number of message bits of a terminal included in the common message and information on a start position corresponding to a message of the terminal in the common message. Thus, each terminal may confirm its information in the common message. In addition, the common message may include bit to symbol mapping information, an encoder type and encoding information, which are not limited to the above-described embodiment.

TABLE 2

A total number of bits constituting a common message
A number of message bits of a UE included in the common message
A start position corresponding to a message of the UE in the common message
Bit to symbol mapping information of the common message
An encoder type and encoder information of the common message In addition, as an example, each terminal may inversely generate a frequency signal for a common message through the common message that is decoded in a received signal. Next, each terminal may start decoding by subtracting the signal for the common message from the received signal.

That is, each terminal may remove the decoded common message signal as an interference signal based on the above-described SIC technique and may decode each private message. Herein, private messages between each terminal may be distinguished based on space multiplexing as in the SDMA scheme described above. As an example, a specific terminal, when receiving a signal from a base station, may confirm a common message by decoding the common message in the signal and may obtain an entire message by generating a frequency signal from the decoded common message, subtracting the frequency signal from the received signal and then decoding a private message of the specific terminal.

Herein, as an example, before each terminal decodes a private message, configuration information on the private message may be needed. At this time, a base station may signal private message configuration information as shown in Table 3 below to each terminal.

As an example, the private message configuration information may include at least any one or more among a total number of bits of a private message, bit to symbol mapping information of the private massage, and encoder type and encoding information of the private message. Each terminal may decode a private message based on the following configuration information on a private message.

TABLE 3

A total number of bits of a private message
Bit to symbol mapping information of the private message
An encoder type and encoder information of the private message Herein, the base station may provide any one of the information on Table 2 and the information on Table 3, which are described above, to each terminal through a control channel in a downlink control information (DCI) form. As an example, Table 4 below may be a field included in DCI, and each field may include configuration information on a common message or configuration information on a private message.

TABLE 4

| Attribute | value |
| --- | --- |
| Total Common message bits | — |
| Common message bits for UE | — |
| Common message start position in common message bits for UE | — |
| MCS for common message | — |
| Encoder type definition for common message | — |
| Total number of private message bits | — |
| MCS for private message | — |
| Encoder type definition for private message | — |

Figure 10:
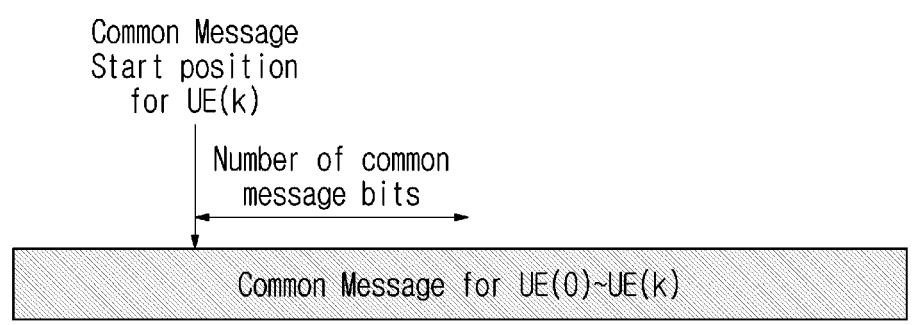
FIG. 10 is a view illustrating a method for transmitting a common message to each terminal based on common message configuration information according to an embodiment of the present disclosure.

Herein, FIG. 10 is a view illustrating a method for transmitting a common message to each terminal based on common message configuration information according to the present disclosure. Referring to FIG. 10, the common message configuration information and the private message configuration information may be differently determined based on an operation method of rate splitting. As an example, it is possible to consider a case where a rate splitting method for each terminal is not changed. That is, as the rate splitting method is not changed every slot or every section, the above-described information may not be indicated through DCI. As an example, the information may be transmitted at a time through medium access control (MAC)-control element (CE), and overhead may be reduced accordingly. That is, when the rate splitting method is not changed, the common message configuration information and the private message configuration information may be semi-static or static information but is not limited to a particular embodiment.

On the other hand, as an example, when the rate splitting method is flexibly changed, the base station may indicate the common message configuration information and the private message configuration information in a DCI form through a control channel of every slot, and thus each terminal may receive a signal from the base station on the basis of a RSMA scheme.

In addition, as an example, based on the RSMA scheme, each terminal may report feedback related to the reception information of a received common message and a received private message to the base station, thereby improving reception performance and total throughput.

Specifically, the base station may transmit initial rate splitting information to each terminal through DCI or another control channel. Herein, each terminal may perform decoding based on the rate splitting information. Next, based on decoding, each terminal may transmit reception-related information on the common message and the private message respectively to the base station.

When the base station obtains at least one or more among the common messages and private messages of all terminals associated with rate splitting in a cell, the base station may determine next rate splitting and transmit corresponding information to each terminal. That is, the base station may adaptively respond to the degradation of reception performance or throughput reduction that may occur due to a rate splitting method, which is fixed based on feedback information received from each terminal.

As another example, it is possible to consider a case where a terminal urgently changes a rate splitting ratio. As an example, the terminal may determine a ratio of at least one of a common message and a private message and a corresponding modulation coding scheme (MCS) and transmit a request message to a base station. Thus, throughput loss caused by a process of reception, measurement and reporting between the base station and the terminal may be prevented.

Figure 11:
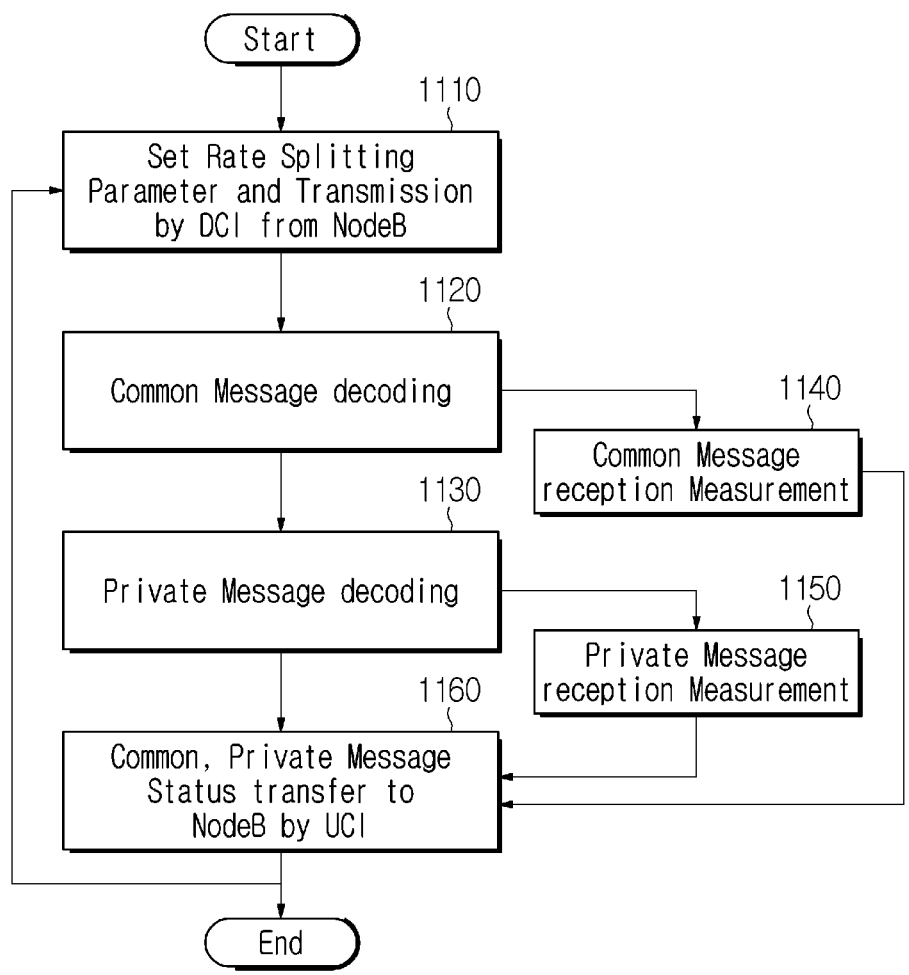
FIG. 11 is a view illustrating a method for reporting, by a terminal, reception-related information of a common message and a private message to a base station according to an embodiment of the present disclosure.

Specifically, FIG. 11 is a view illustrating a method for reporting, by a terminal, reception-related information of a common message and a private message to a base station according to the present disclosure.

Referring to FIG. 11, the base station may provide a parameter for rate splitting corresponding to each terminal as an initial set value to a terminal in a DCI form through a physical downlink control channel (PDCCH) (S1110). Herein, a field added to the DCI may be shown in Table 4 but is not limited thereto. Next, each terminal may confirm the rate splitting-related parameter through DCI received from the base station and may perform decoding based on the parameter. As an example, a terminal may perform decoding for a common message first (S1120) and then may perform decoding for a private message (S1130), which is the same as described above. Herein, as an example, the terminal may perform measurement based on a symbol corresponding to the common message (S1140). Specifically, the terminal may calculate at least any one of the signal noise ratio (SNR), signal interference noise ratio (SINR) and decoding error of the symbol that corresponds to the common message. Also, after the decoding of the common message, the terminal may generate and subtract a frequency signal from a received signal and then may perform decoding of a private message. That is, the terminal may configure a common message symbol by using an MCS and encoder information, which are related to the common message, and then subtract the common message symbol from the received signal, thereby confirming a part corresponding to the private message. Herein, the terminal may decode the private message by using private message configuration information that is received through DCI. Also, the terminal may perform measurement for the private message (S1150). Specifically, the terminal may calculate an SNR and decoding error information that correspond to the private message. Next, the terminal may transmit status information based on at least one of the common message and the private message to the base station through uplink control information (UCI) (S1160). Herein, as an example, the UCI may a field for Table 5 below but is not limited thereto.

TABLE 5

| Attribute | value |
|---|---|
| Common message SINR | — |
| Common decoding status | — |
| private message SINR | — |
| private decoding status | — |

When receiving the information of Table 5 described above from each terminal, the base station may modify the MCS and rate splitting ratio of the common message by integrating the information. Thus, the base station may optimize the MCS and the rate splitting ratio between the base station and a terminal.

For a concrete example, a base station may confirm decoding status and SINRs of a common message and a private message, which are received from a first terminal. Herein, it is possible to consider a case where a decoding error occurs as the reception SINR of the private message is low. Herein, it is possible to consider a case where the reception SINR of the common message is high and decoding success occurs. In case the base station receives the information from the first terminal, the base station may increase the decoding success rate of the private message by adjusting the MCS level of the private message.

As another example, based on the common message and the private message received from the first terminal, the base station may consider a case where the reception SINR of the common message is low and decoding fails. Herein, as the private message uses common message decoding information, when the common message decoding fails, an error may also occur to the private message. Accordingly, the base station may reduce a rate splitting ratio of the common message and may confirm whether or not the common message decoding is successful and whether or not the private message decoding is successful. That is, the base station may improve a data transmission success rate by adjusting the rate splitting ratio and MCS based on feedback information, which is received from each terminal, and various types of control may be possible.

Figure 12:
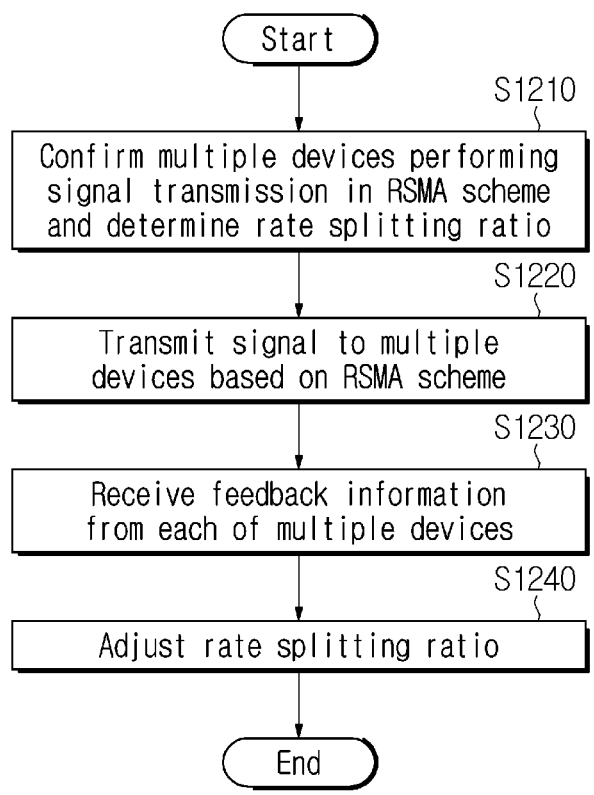
FIG. 12 is a view illustrating a method for performing, by a base station and a terminal, a communication based on a RSMA scheme according to an embodiment of the present disclosure.

FIG. 12 is a view illustrating a method for performing, by a base station and a terminal, a communication based on a RSMA scheme according to the present disclosure.

Referring to FIG. 12, the base station may confirm multiple terminals, which will perform signal transmission based on a RSMA scheme, and may determine a rate splitting ratio (S1210). As an example, the base station may confirm multiple terminals that perform signal transmission in a cell based on a RSMA scheme. For a concrete example, when a terminal is connected to the base station, the base station may check, as capacity information of the terminal, whether or not communication is possible by the RSMA scheme. As an example, a terminal may support the RSMA scheme based on the implementation of a receiving end. Herein, in a new communication system, there may be not only an existing terminal but also various types of terminals, and different channel environments may exist. That is, each terminal may support different communication schemes, as described above. In consideration of the above description, when a terminal performs initial access, the base station may check, as capacity information of the terminal, whether or not communication is possible by the RSMA scheme. Also, the base station may confirm multiple terminals, which will perform signal transmission by the RSMA scheme, among terminals that are capable of communication using the RSMA scheme. Next, the base station may transmit a signal to the multiple terminals based on the RSMA scheme (S1220).

Herein, as described above, the base station may determine a rate splitting ratio and deliver information thereon to terminals. Specifically, the base station may configure a common message by confirming data to be transmitted to each terminal and may determine MCS and an encoding type for the common message. Herein, the type and size of data, which the base station transmits to each terminal, may vary in real time, and the base station may configure the common message by confirming each data set to be transmitted to multiple terminals. As an example, the base station may determine a total number of bits of the common message by confirming each data set that is transmitted to multiple terminals. As another example, the total number of bits of the common message may be fixed, and the base station may generate the common message with a size corresponding to the fixed number of bits by extracting partial data from data transmitted to multiple terminals. However, the present disclosure is not limited to the above-described embodiment. Next, the base station may configure a message of each terminal, which is not included in the common message, as a private message. Herein, the base station may confirm total bit number information for each private message by confirming the number of bits that is extracted as a common message part from data of each terminal. Also, the base station may determine MCS and an encoding type for a private message. Next, the base station may transmit the common message and the private message to each terminal.

Herein, as an example, a DCI format may be newly defined by considering data transmission based on the RSMA scheme. As an example, the DCI format may include the fields of Table 4 described above. That is, a DCI format considering the RSMA scheme may be newly determined and, when receiving DCI corresponding to the format, a terminal may recognize that a signal is transmitted based on the RSMA scheme and may confirm common message configuration information and private message configuration information by decoding the signal. Also, as an example, the base station may configure common message information and private message information based on identification information of each terminal. As an example, bit number information and start position information, which are assigned to a specific terminal within a common message, may be indicated based on identification information of the terminal. Also, a private message may be distinguished based on the identification information of the terminal. As another example, the information of Table 4 described above may be indicated as bit map information. For a concrete example, a total number of bits of a common message may be fixed, and a bit size and a start position, which are assigned to each terminal, may be indicated by specific values. However, the present disclosure is not limited to the embodiment.

As described above, when a common message and a private message are transmitted to each terminal, the each terminal may perform measurement for the common message and the private message respectively. That is, the each terminal may perform measurement for the common message and measurement for the private message and may generate feedback information on the common message and the private message respectively. Herein, as an example, the each terminal may generate, as feedback information, at least any one of SNR, SINR and decoding error information for the common message and the private message respectively. Next, the each terminal may feed the information back to the base station. Herein, the base station may adjust a rate splitting ratio based on the feedback information received from terminals (S1240). That is, the base station may determine the rate splitting ratio by reflecting the feedback information on the common message and the feedback information on the private message, thereby enhancing transmission efficiency.

As another example, each terminal may transmit ACK/NACK information on whether or not decoding of a common message and a private message each is successful. That is, each terminal may set and feed the ACK/NACK information on the common message and the ACK/NACK information on the private message respectively back to a base station, to which the present disclosure is not limited. As another example, as each terminal is capable of obtaining data only when it succeeds in decoding both a common message and a private message, NACK may be transmitted when decoding of one of the messages fails. That is, each terminal may send ACK only when decoding of every message is successful, but the present disclosure is not limited to the embodiment.

As another example, a base station may perform learning by using a learning model on the basis of feedback information received from each terminal. As an example, the RSMA scheme generates partial data, which is extracted from multiple terminals, as a common message, and each private message may exist. Herein, feedback information may be transmitted for each of the common message and the private message. That is, the base station may process a multiple pieces of feedback information so that it may not be easy to determine a rate splitting ratio. Accordingly, the base station may perform learning through a learning model by using the feedback information as input and may obtain a rate splitting ratio as an output value. Thus, the common message and the private message may be efficiently configured, but the present disclosure is not limited to the embodiment.

Figure 13:
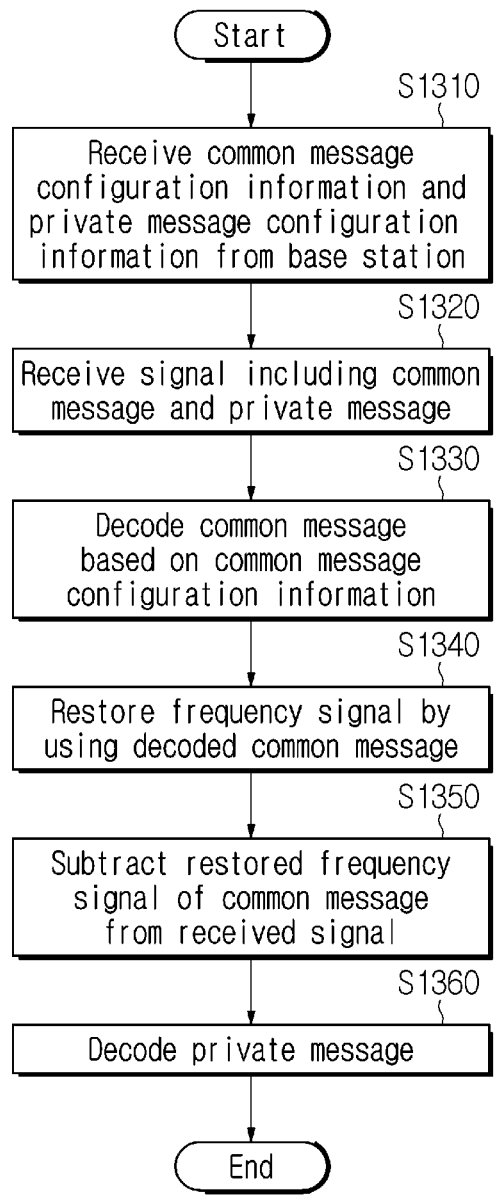
FIG. 13 is a view illustrating a method for receiving, by a terminal, a signal according to an embodiment of the present disclosure.

FIG. 13 is a view illustrating a method for receiving, by a terminal, a signal according to the present disclosure. Referring to FIG. 13, the terminal may receive common message configuration information and private message configuration information from a base station (S1310). Next, the terminal may receive a signal including a common message and a private message from the base station (S1320). Herein, as an example, the base station may transmit the common message to the terminal by including a part of a message transmitted to the terminal in the common message. Also, the common message may include a part of a message for another terminal, as described above. Also, the remaining part of a message, of which a part is included in the common message, may be included in a private message and be transmitted to the terminal, as described above.

Herein, as an example, the common message configuration information may include at least any one or more among a total number of bits of the common message, a number of message bits of the terminal included in the common message, a start position corresponding the message of the terminal in the common message, bit to symbol mapping information of the common message, and encoder information of the common message, which may be the same as in Table 2 above. Also, as an example, the private message configuration information may include at least any one or more among a total number of bits of the private message, bit to symbol mapping information of the private massage, and encoder information of the private message, which may be the same as in Table 3.

Herein, as an example, the terminal may receive the common message configuration information and the private message configuration information from the base station in every slot via a control channel in a form of DCI. As another example, the terminal may receive the common message configuration information and the private message configuration information from the base station through MAC CE, which is not limited to the above-described embodiment.

Next, the terminal may decode the common message based on the common message configuration information (S1330). Next, the terminal may restore a frequency signal by using the decoded common message (S1340) and subtract the restored frequency signal of the common message from the received signal (S1350). Next, the terminal may perform decoding of the private message, which is the same as described above.

Also, as an example, the terminal may generate common message feedback information based on measurement of the common message. Also, the terminal may generate private message feedback information based on measurement of the private message. Herein, the terminal may obtain any one or more among SNR, SINR, and decoding error information based on the measurement.

Herein, as an example, the terminal may transmit the common message feedback information and the private message feedback information to the base station through UCI, which is the same as described above. The base station may modify rate splitting for the common message and the private message of the terminal based on the common message feedback information and the private message feedback information. Herein, the base station may receive the feedback information from each of multiple terminals so that the base station may modify rate splitting. Next, the base station may transmit modified common message configuration information and modified private configuration information based on the modified rate splitting to the terminal, which is the same as described above.

System and Various Devices, to which Embodiments of the Present Disclosure are Applicable Various embodiments of the present disclosure may be combined with each other.

Hereinafter, a device, to which various embodiments of the present disclosure are applicable, will be described. Although not limited thereto, various descriptions, functions, procedures, proposes, methods and/or operation flow-charts disclosed in the present disclosure are applicable to various fields requiring wireless communication/connection (e.g., 5G) between devices.

Hereinafter, it will be described in greater detail with reference to the drawings. In the following drawings/description, the same reference numerals may denote the same or corresponding hardware blocks, software blocks or functional blocks unless otherwise stated.

Figure 14:
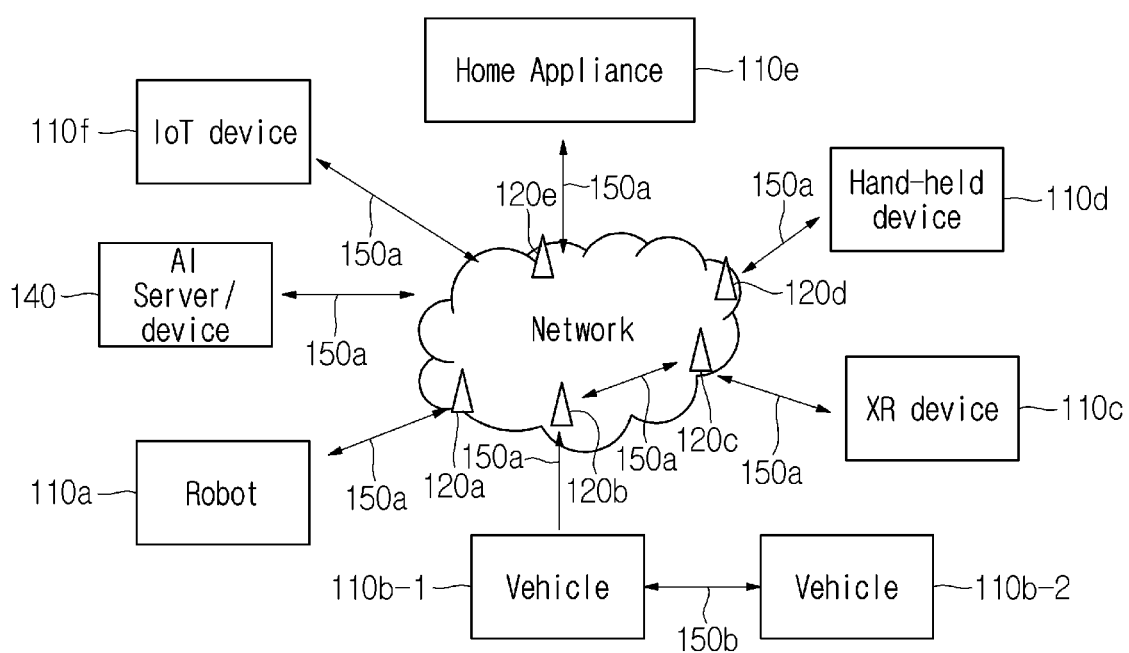
FIG. 14 is a view illustrating an example of a communication system according to an embodiment of the present disclosure.

FIG. 14 illustrates an example of a communication system according to an embodiment of the present disclosure. The embodiment of FIG. 14 may be combined with various embodiments of the present disclosure.

Referring to FIG. 14, a communication system applied to the present disclosure includes a wireless device, a base station and a network. Here, the wireless device means a device for performing communication using radio access technology (e.g., 5G NR or LTE) and may be referred to as a communication/wireless/5G device. Although not limited thereto, the wireless device may include at least one of a robot 110*a*, vehicles 110*b*-1 and 110*b*-2, an extended reality (XR) device 110*c*, a hand-held device 110*d*, a home appliance 110*e*, an Internet of Thing (IoT) device 110*f* or an artificial intelligence (AI) device/server 110*g*. For example, the vehicle may include a vehicle having a wireless communication function, an autonomous vehicle, a vehicle capable of performing vehicle-to-vehicle communication or the like. Here, the vehicles 110*b*-1 and 110*b*-2 may include an unmanned aerial vehicle (UAV) (e.g., drone). The XR device 110*c* may include an augmented reality (AR)/virtual reality (VR)/mixed reality (MR) device and may be implemented in the form of a head-mounted device (HMD), a head-up display provided in a vehicle, a television, a smartphone, a computer, a wearable device, a home appliance, a digital signage, a vehicle, a robot, etc. The hand-held device 110*d* may include a smartphone, a smart pad, a wearable device (e.g., a smartwatch or smart glasses), a computer (e.g., a laptop, etc.), etc. The home appliance 110*e* may include a TV, a refrigerator, a washing machine, etc. The IoT device 110*f* may include a sensor, a smart meter, etc. For example, the base stations 120*a* to 120*e* and the network may be implemented by a wireless device, and the specific wireless device 120*a* may operate as a base station/network node for the other wireless devices.

Here, wireless communication technology implemented in the wireless devices 110*a* to 110*f* of this disclosure may include not only LTE, NR and 6G but also narrowband Internet of things for low-power communication. In this case, for example, NB-IoT technology may be an example of LPWAN (Low Power Wide Area Network) technology and may be implemented in the standard such as LTE Cat NB1 and/or LTE Cat NB2, without being limited to the above-described names. Additionally or alternatively, the wireless communication technology implemented in the wireless devices 110*a* to 110*f* of this disclosure may perform communication based on LTE-M technology. In this case, for example, the LTE-M technology may be an example of LPWAN technology, and may be referred to as various names such as eMTC (enhanced Machine Type Communication). For example, the LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, without being limited to the above-described names. Additionally or alternatively, the wireless communication technology implemented in the wireless devices 110*a* to 110*f* of this disclosure may include at least one of ZigBee considering low-power communication, Bluetooth or low power wide area network (LPWAN), without being limited to the above-described names. For example, the ZigBee technology may generate personal area networks (PANs) related to small/low-power digital communication based on various standards such as IEEE 802.15.4 and may be referred to as various names.

The wireless devices 110a to 110f may be connected to the network through the base station 120a to 120e. AI technology is applicable to the wireless devices 110a to 110f, and the wireless devices 110a to 110f may be connected to the AI server 110g through the network. The network may be configured using a 3G network, a 4G (e.g., LTE) network, a 5G (e.g., NR) network, etc. The wireless devices 110a to 110f may communicate with each other through the base station 120a to 120e/network, or may perform direct communication (e.g., sidelink communication) without the base station 120a to 120e/network. For example, the vehicles 110b-1 and 110b-2 may perform direct communication (e.g., V2V (vehicle to vehicle)/V2X (vehicle to everything) communication). In addition, the IoT device 110f (e.g., a sensor) may perform direct communication with another IoT device (e.g., a sensor) or the other wireless devices 110a to 110f.

Wireless communication/connection 150a, 150b or 150c may be performed/established between the wireless devices 110a to 110f/base station 120a to 120e and the base station 120a to 120e/base station 120a to 120e. Here, wireless communication/connection may be performed/established through various radio access technologies (e.g., 5G NR) such as uplink/downlink communication 150a, sidelink communication 150b (or D2D communication) or BS-to-BS communication 150c (e.g., relay or integrated access backhaul (IAB)). The wireless device and the base station/wireless device or the base station and the base station may transmit/receive radio signals to/from each other through wireless communication/network 150a, 150b or 150c. For example, wireless communication/network 150a, 150b or 150c may enable signal transmission/reception through various physical channels. To this end, based on various proposes of the present disclosure, at least some of various configuration information setting processes for transmission/reception of radio signals, various signal processing procedures (e.g., channel encoding/decoding, modulation/demodulation, resource mapping/demapping, etc.) or resource allocation processes may be performed.

Figure 15:
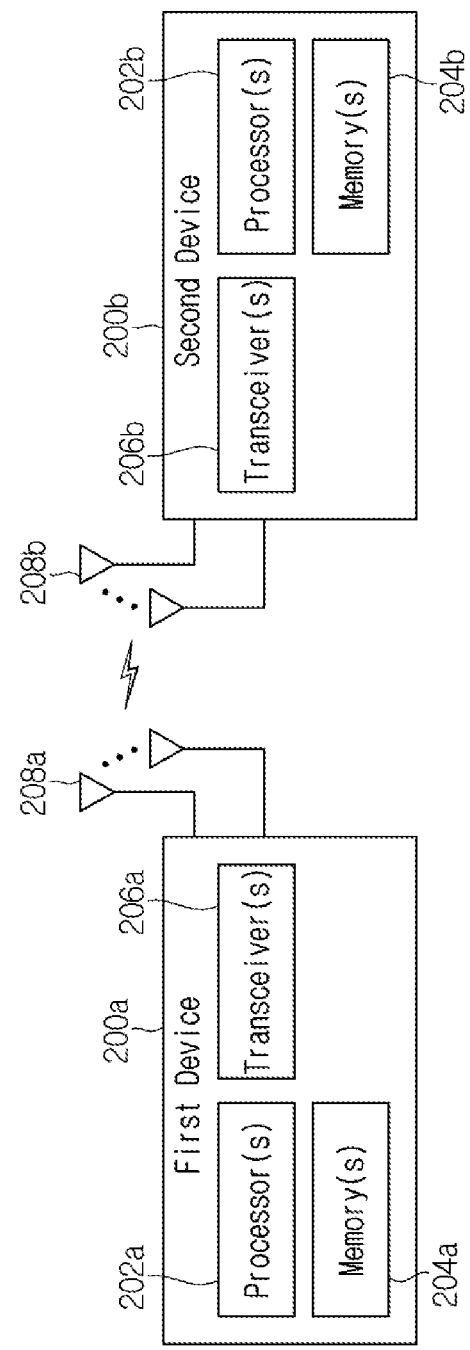
FIG. 15 shows an example of a wireless device according to an embodiment of the present disclosure.

FIG. 15 illustrates an example of a wireless device according to an embodiment of the present disclosure.

Referring to FIG. 15, a first wireless device 200a and a second wireless device 200b may transmit/receive radio signals through various radio access technologies (e.g., LTE or NR). Here, {the first wireless device 200a and the second wireless device 200b} may correspond to {the wireless device 110x and the base station 120x} and/or {the wireless device 110x and the wireless device 110x} of FIG. 1.

The first wireless device 200a includes one or more processors 202a and one or more memories 204a and may further include one or more transceivers 206a and/or one or more antennas 208a. The processor 202a may be configured to control the memory 204a and/or the transceiver 206a and to implement the descriptions, functions, procedures, proposes, methods and/or operation flowcharts disclosed in the present disclosure. For example, the processor 202a may process information in the memory 204a to generate first information/signal and then transmit a radio signal including the first information/signal through the transceiver 206a. In addition, the processor 202a may receive a radio signal including second information/signal through the transceiver 206a and thus store information obtained from signal processing of the second information/signal in the memory 204a. The memory 204a may be connected to the processor 202a to store a variety of information related to operation of the processor 202a. For example, the memory 204a may perform some or all of the processes controlled by the processor 202a or store software code including commands for performing the descriptions, functions, procedures, proposes, methods and/or operation flowcharts disclosed in the present disclosure. Here, the processor 202a and the memory 204a may be a portion of a communication modem/circuit/chip designed to implement wireless communication technology (e.g., LTE or NR). The transceiver 206a may be connected to the processor 202a to transmit and/or receive radio signals through one or more antennas 208a. The transceiver 206a may include a transmitter and/or a receiver. The transceiver 206a may be used interchangeably with a radio frequency (RF) unit. In the present disclosure, the wireless device may mean a communication modem/circuit/chip.

The second wireless device 200b performs wireless communication with the first wireless device 200a, includes one or more processors 202b and one or more memories 204b and may further include one or more transceivers 206b and/or one or more antennas 208b. The functions of the one or more processors 202b, the one or more memories 204b, the one or more transceivers 206b and/or the one or more antennas 208b are similar to those of the one or more processors 202a, the one or more memories 204a, the one or more transceivers 206a and/or the one or more antennas 208a of the first wireless device 200a.

Hereinafter, the hardware elements of the wireless devices 200a and 200b will be described in greater detail. Although not limited thereto, one or more protocol layers may be implemented by one or more processors 202a and 202b. For example, the one or more processors 202a and 202b may implement one or more layers (e.g., functional layers such as PHY (physical), MAC (media access control), RLC (radio link control), PDCP (packet data convergence protocol), RRC (radio resource control), SDAP (service data adaptation protocol)). The one or more processors 202a and 202b may generate one or more protocol data units (PDUs), one or more service data units (SDUs), messages, control information, data or information according to the descriptions, functions, procedures, proposes, methods and/or operation flowcharts disclosed in the present disclosure. The one or more processors 202a and 202b may generate and provide signals (e.g., baseband signals) including the PDUs, the SDUs, the messages, the control information, the data or the information to the one or more transceivers 206a and 206b according to the functions, procedures, proposes and/or methods disclosed in the present disclosure. The one or more processors 202a and 202b may receive signals (e.g., baseband signals) from one or more transceivers 206a and 206b to obtain the PDUs, the SDUs, the messages, the control information, the data or the information according to the descriptions, functions, procedures, proposes, methods and/or operation flowcharts disclosed in the present disclosure.

The one or more processors 202a and 202b may be referred to as controllers, microcontrollers or microcomputers. The one or more processors 202a and 202b may be implemented by hardware, firmware, software or a combination thereof. For example, one or more ASICs (application specific integrated circuits), one or more DSPs (digital signal processors), one or more DSPDs (digital signal processing devices), one or more PLDs (programmable logic devices) or one or more FPGAs (field programmable gate arrays) may be included in the one or more processors 202a and 202b. The descriptions, functions, procedures, proposes, methods and/or operation flowcharts disclosed in the present disclosure may be implemented using firmware or software, and the firmware or software may be implemented to include modules, procedures, functions, etc. The firmware or software configured to perform descriptions, functions, procedures, proposes, methods and/or operation flowcharts disclosed in the present disclosure may be included in the one or more processors 202a and 202b or stored in the one or more memories 204a and 204b and driven by the one or more processors 202a and 202b. The descriptions, functions, procedures, proposes, methods and/or operation flowcharts disclosed in the present disclosure may be implemented using firmware or software in the form of code, a command and/or a set of commands.

The one or more memories 204a and 204b may be connected to the one or more processors 202a and 202b to store various types of data, signals, messages, information, programs, code, instructions and/or commands. The one or more memories 204a and 204b may include a ROM (read only memory), a RAM (random access memory), an EPROM (erasable programmable read only memory), a flash memory, a hard drive, a register, a cache memory, a computer-readable storage medium and/or a combination thereof. The one or more memories 204a and 204b may be located inside and/or outside the one or more processors 202a and 202b. In addition, the one or more memories 204a and 204b may be connected to the one or more processors 202a and 202b through various technologies such as wired or wireless connection.

The one or more transceivers 206a and 206b may transmit, to one or more other devices, user data, control information, radio signals/channels, etc. described in the methods and/or operation flowcharts of the present disclosure. The one or more transceivers 206a and 206b may receive, from one or more other devices, user data, control information, radio signals/channels, etc. described in the descriptions, functions, procedures, proposes, methods and/or operation flowcharts disclosed in the present disclosure. In addition, the one or more transceivers 206a and 206b may be connected to the one or more antennas 208a and 208b and may be configured to transmit/receive user data, control information, radio signals/channels, etc. described in the descriptions, functions, procedures, proposes, methods and/or operation flowcharts disclosed in the present disclosure through the one or more antennas 208a and 208b. In the present disclosure, one or more antennas may be a plurality of physical antennas or a plurality of logical antennas (e.g., antenna ports). The one or more transceivers 206a and 206b may convert the received radio signals/channels, etc. from RF band signals to the baseband signals, in order to process the received user data, control information, radio signals/channels, etc. using the one or more processors 202a and 202b. The one or more transceivers 206a and 206b may convert the user data, control information, radio signals/channels, etc. processed using the one or more processors 202a and 202b from a baseband signal to an RF band signal. To this end, the one or more transceivers 206a and 206b may include an (analog) oscillator and/or a filter.

Figure 16:
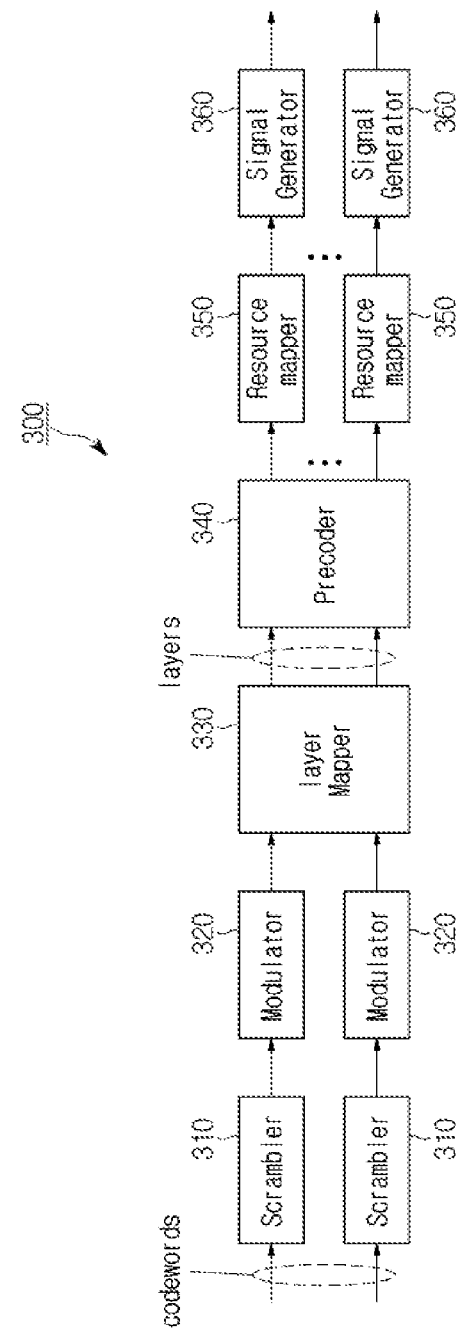
FIG. 16 shows a circuit of processing a transmission signal according to an embodiment of the present disclosure.

FIG. 16 illustrates a circuit for processing a transmitted signal according to an embodiment of the present disclosure. The embodiment of FIG. 16 may be combined with various embodiments of the present disclosure.

Referring to FIG. 16, a signal processing circuit 300 may include a scrambler 310, a modulator 320, a layer mapper 330, a precoder 340, a resource mapper 350 and a signal generator 360. In this case, for example, the operation/function of FIG. 16 may be performed by the processors 202a and 202b and/or the transceivers 206a and 206b of FIG. 15. In addition, for example, the hardware element of FIG. 16 may be implemented in the processors 202a and 202b and/or the transceivers 206a and 206b of FIG. 15. For example, blocks 310 to 360 may be implemented in the processors 202a and 202b of FIG. 15. Alternatively, the blocks 310 to 350 may be implemented in the processors 202a and 202b of FIG. 15 and the block 360 may be implemented in the transceivers 206a and 206b of FIG. 15, without being limited to the above-described embodiment.

The codeword may be converted into a radio signal through the signal processing circuit 300 of FIG. 16. Here, the codeword is a coded bit sequence of an information block. The information block may include a transport block (e.g., a UL-SCH transport block or a DL-SCH transport block). The radio signal may be transmitted through various physical channels (e.g., a PUSCH and a PDSCH) of FIG. 16. Specifically, the codeword may be converted into a bit sequence scrambled by the scrambler 310. The scramble sequence used for scramble is generated based on an initialization value and the initialization value may be included in ID information, etc. of the wireless device. The scrambled bit sequence may be modulated to a modulation symbol sequency by the modulator 320. A modulation scheme may include pi/2-BPSK(pi/2-binary phase shift keying), m-PSK (m-phase shift keying), m-QAM(m-quadrature amplitude modulation), etc.

A complex modulation symbol sequence may be mapped to one or more transport layers by the layer mapper 330. The modulation symbols of each transport layer may be mapped to the corresponding antenna port(s) by the precoder 340 (precoding). The output z of the precoder 340 may be obtained by multiplying the output y of the layer mapper 330 by a N*M precoding matrix W. Here, N is the number of antenna ports and M is the number of transport layers. Here, the precoder 340 may perform precoding after performing transform precoding (e.g., discrete Fourier transform (DFT)) with respect to complex modulation symbols. In addition, the precoder 340 may perform precoding without performing transform precoding.

The resource mapper 350 may map the modulation symbols of each antenna port to time-frequency resources. The time-frequency resources may include a plurality of symbols (e.g., CP-OFDMA symbols and DFT-s-OFDMA symbols) in the time domain and include a plurality of subcarriers in the frequency domain. The signal generator 360 may generate a radio signal from the mapped modulation symbols and transmit the generated radio signal to another device through each antenna. To this end, the signal generator 360 may include an inverse fast Fourier transform (IFFT) module and a cyclic prefix (CP) inserter, a digital-to-analog converter (DAC), a frequency uplink converter, etc.

A signal processing procedure for a received signal in a wireless device may be performed inversely to the signal processing procedure of FIG. 16. For example, the wireless device (e.g., 200a and 200b of FIG. 15) may receive a radio signal from the outside through an antenna port/transceiver. The received radio signal may be converted into a baseband signal through a signal restorer. To this end, the signal restorer may include a frequency downlink converter, an analog-to-digital converter (ADC), a CP remover and a fast Fourier transform (FFT) module. Thereafter, the baseband signal may be restored to a codeword through a resource de-mapper processor, a postcoding processor, a demodulation process and a de-descramble process. The codeword may be restored to an original information block through decoding. Accordingly, a signal processing circuit (not shown) for the received signal may include a signal restorer, a resource de-mapper, a postcoder, a demodulator, a de-scrambler and a decoder.

Figure 17:
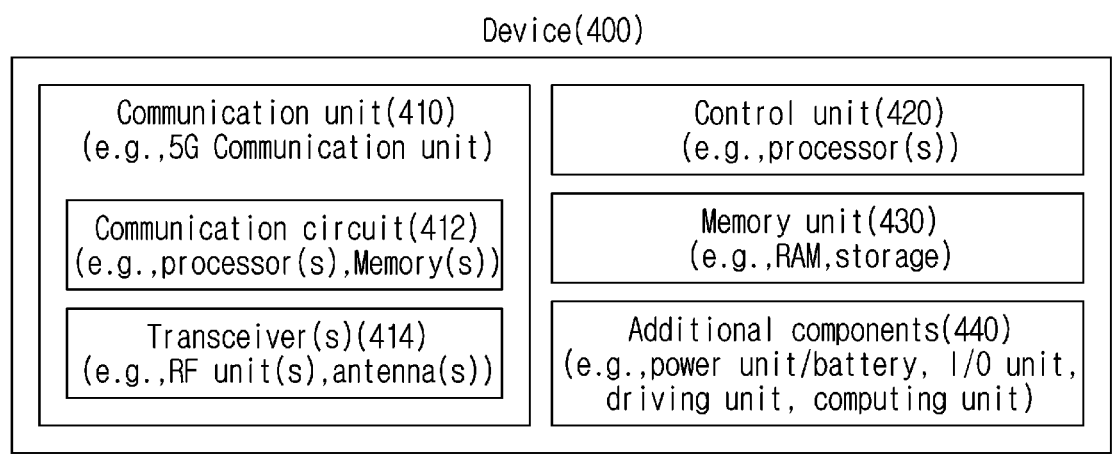
FIG. 17 shows another example of a wireless device according to an embodiment of the present disclosure.

FIG. 17 illustrates another example of a wireless device according to an embodiment of the present disclosure. The embodiment of FIG. 17 may be combined with various embodiments of the present disclosure.

Referring to FIG. 17, the wireless device 300 corresponds to the wireless devices 200a and 200b of FIG. 15 and may include various elements, components, units and/or modules. For example, the wireless device 400 may include a communication unit 410, a control unit 420, a memory unit 430 and additional components 440.

The communication unit 410 may include a communication circuit 412 and transceiver(s) 414. The communication unit 410 may transmit and receive signals (e.g., data, control signals, etc.) to and from other wireless devices or base stations. For example, the communication circuit 412 may include the one or more processors 202a and 202b and/or the one or more memories 204a and 204b of FIG. 15. For example, the transceiver(s) 414 may include the one or more transceivers 206a and 206b and/or the one or more antennas 208a and 208b of FIG. 15.

The control unit 420 may consist of a set of one or more processors. For example, the control unit 420 may consist of a set of a communication control processor, an application processor (AP), an electronic control unit (ECU), a graphics processor and a memory control processor. The control unit 420 may be electrically connected to the communication unit 410, the memory unit 430 and the additional components 440 to control overall operation of the wireless device. For example, the control unit 420 may control electrical/mechanical operation of the wireless device based on the program/code/command/information stored in the memory unit 430. In addition, the control unit 420 may transmit the information stored in the memory unit 430 to the outside (e.g., another communication device) through the communication unit 410 using a wireless/wired interface or store, in the memory unit 430, the information received from the outside (e.g., another communication device) through the communication unit 410 using a wireless/wired interface.

The memory unit 430 may include a RAM, a DRAM (dynamic RAM), a ROM, a flash memory, a volatile memory, a non-volatile memory and/or a combination thereof. The memory unit 430 may store data/parameters/programs/code/commands necessary to drive the wireless device 400. In addition, the memory unit 430 may store input/output data/information, etc.

The additional components 440 may be variously configured according to the type of the wireless device. For example, the additional components 440 may include at least one of a power unit/battery, an input/output unit, a driving unit or a computing unit. Although not limited thereto, the wireless device 400 may be implemented in the form of a robot (FIG. 1, 110a), a vehicle (FIGS. 1, 110b-1 and 110b-2), an XR device (FIG. 1, 110c), a hand-held device (FIG. 1, 110d), a home appliance (FIG. 1, 110e), an IoT device (FIG. 1, 110f), a digital broadcast terminal, a hologram device, a public safety device, an MTC device, a medical device, a Fintech device (or a financial device), a security device, a climate/environment device, an AI server/device (FIG. 1, 140), or a network node. The wireless device is movable or may be used at a fixed place according to the use example/service.

Figure 18:
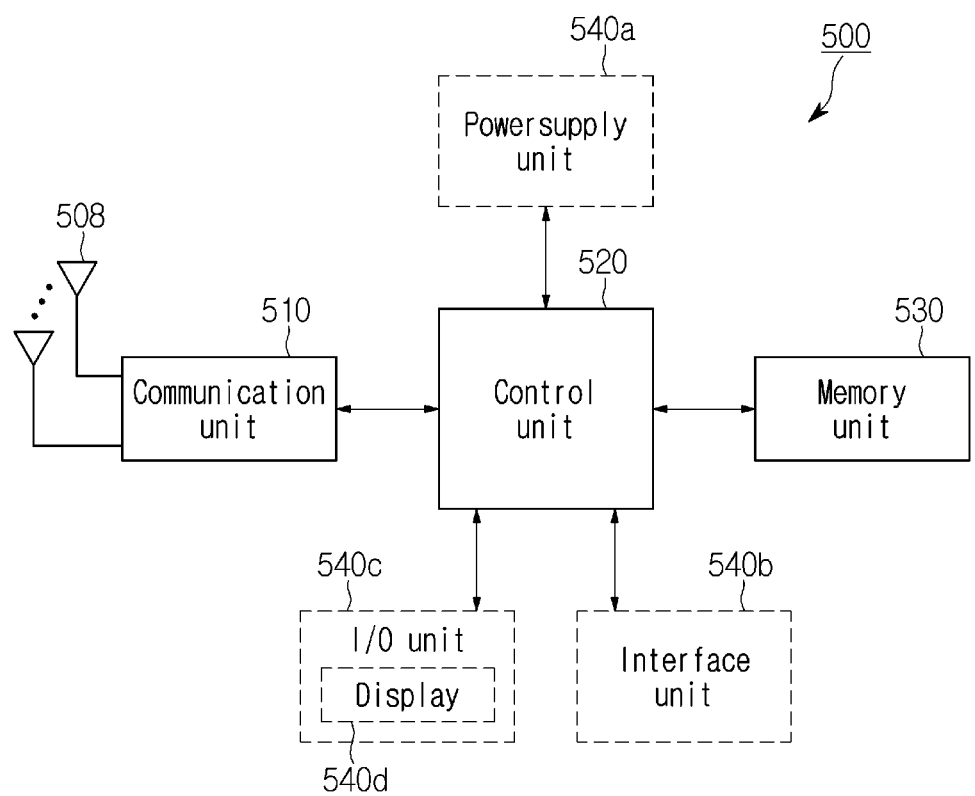
FIG. 18 shows an example of a portable device according to an embodiment of the present disclosure.

FIG. 18 illustrates an example of a hand-held device according to an embodiment of the present disclosure. FIG. 18 shows a hand-held device applied to the present disclosure. The hand-held device may include a smartphone, a smart pad, a wearable device (e.g., a smartwatch or smart glasses), a portable computer (e.g., a laptop), etc. The embodiment of FIG. 18 may be combined with various embodiments of the present disclosure.

Referring to FIG. 18, the hand-held device 500 may include an antenna unit 508, a communication unit 510, a control unit 530, a power supply unit 540a, an interface unit 540b and an input/output unit 540c. The antenna unit 508 may be a portion of the communication unit 510. Blocks 510 to 530/540a to 540c may respectively correspond to the blocks 410 to 430/440 of FIG. 17 and a repeated description thereof will be omitted.

The communication unit 510 may transmit and receive signals, the control unit 520 may control the hand-held device 500, and the memory unit 530 may store data, etc. The power supply unit 540a may supply power to the hand-held device 500 and include a wired/wireless charging circuit, a battery, etc. The interface unit 540b may support connection between the hand-held device 500 and another external device. The interface unit 540b may include various ports (e.g., an audio input/output port and a video input/output port) for connection with the external device. The input/output unit 540c may receive or output image video information/signals, audio information/signals, data and/or information received from a user. The input/output unit 540c may include a camera, a microphone, a user input unit, a display 540d, a speaker and/or a haptic module.

For example, in the case of data communication, the input/output unit 540c may obtain information/signals (e.g., touch, text, voice, image or video) received from the user and store the obtained information/signals in the memory unit 530. The communication unit 510 may convert the information/signals stored in the memory into radio signals and transmit the converted radio signals to another wireless device directly or to the base station. In addition, the communication unit 510 may receive the radio signals from another wireless device or the base station and then restore the received radio signals into original information/signals. The restored information/signals may be stored in the memory unit 530 and then output through the input/output unit 540c in various forms (e.g., text, voice, image, video or haptic).

Figure 19:
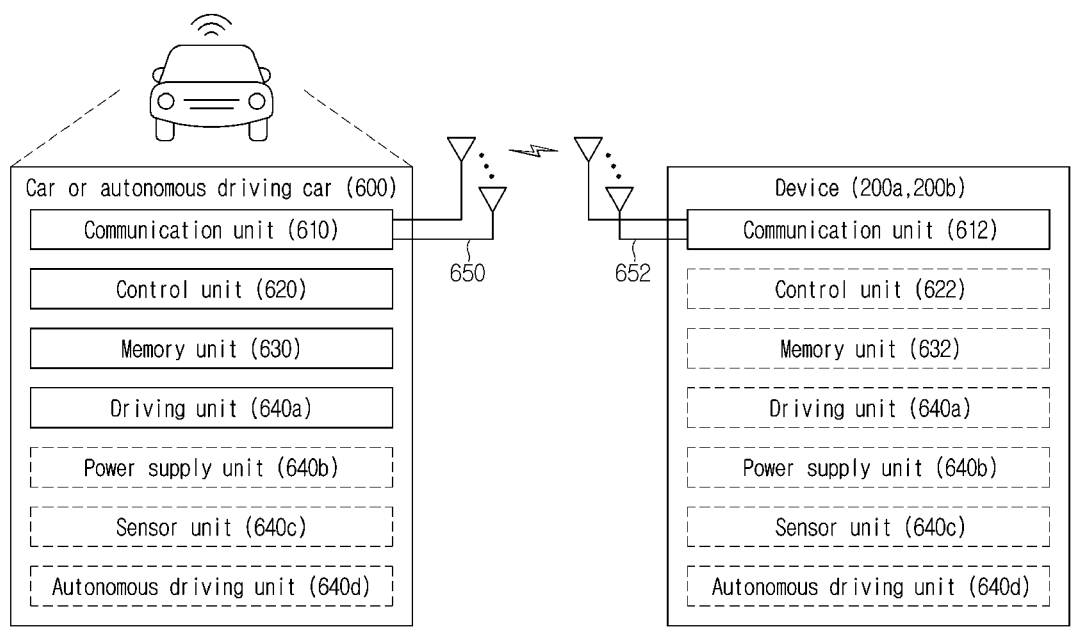
FIG. 19 shows an example of a vehicle or an autonomous vehicle according to an embodiment of the present disclosure.

FIG. 19 illustrates an example of a vehicle or an autonomous vehicle according to an embodiment of the present disclosure. FIG. 19 shows a vehicle or an autonomous vehicle applied to the present disclosure. The vehicle or autonomous vehicle may be implemented by a mobile robot, a car, a train, a manned/unmanned Aerial Vehicle (AV), a ship, etc., but the shape of the vehicle is not limited. The embodiment of FIG. 19 may be combined with various embodiments of the present disclosure.

Referring to FIG. 19, a vehicle or autonomous vehicle 600 may include an antenna unit 608, a communication unit 610, a control unit 620, a driving unit 640a, a power supply unit 640b, a sensor unit 640c, and an autonomous driving unit 640d. The antenna unit 608 may be configured as a part of the communication unit 610. The blocks 610/630/640a~640d correspond to the blocks 510/530/540 of FIG. 18, respectively, and a repeated description thereof will be omitted.

The communication unit 610 may transmit and receive signals (e.g., data and control signals) to and from external devices such as other vehicles, BSs (e.g., gNBs and road side units), and servers. The control unit 620 may perform various operations by controlling elements of the vehicle or the autonomous vehicle 600. The control unit 620 may include an Electronic Control Unit (ECU). The driving unit 640*a* may cause the vehicle or the autonomous vehicle 600 to drive on a road. The driving unit 640*a* may include an engine, a motor, a powertrain, a wheel, a brake, a steering device, etc. The power supply unit 640*b* may supply power to the vehicle or the autonomous vehicle 600 and include a wired/wireless charging circuit, a battery, etc. The sensor unit 640*c* may obtain a vehicle state, ambient environment information, user information, etc. The sensor unit 640*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 640*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 610 may receive map data, traffic information data, etc., from an external server. The autonomous driving unit 640*d* may generate an autonomous driving path and a driving plan from the obtained data. The control unit 620 may control the driving unit 640*a* such that the vehicle or the autonomous vehicle 600 may move along the autonomous driving path according to the driving plan (e.g., speed/direction control). In the middle of autonomous driving, the communication unit 610 may aperiodically/periodically obtain recent traffic information data from the external server and obtain surrounding traffic information data from neighboring vehicles. In the middle of autonomous driving, the sensor unit 640*c* may obtain a vehicle state and/or surrounding environment information. The autonomous driving unit 640*d* may update the autonomous driving path and the driving plan based on the newly obtained data/information. The communication unit 610 may transfer information on a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

The embodiments of the present disclosure have the following effects.

According to the present disclosure, it is possible to efficiently maintain self-interference cancellation performance of a certain level or more in a UE performing full duplex radio (FDR) communication.

The effects of the present disclosure are not limited to the above-described effects and other effects which are not described herein may be derived by those skilled in the art from the description of the embodiments of the present disclosure. That is, effects which are not intended by the present disclosure may be derived by those skilled in the art from the embodiments of the present disclosure.

Since examples of the above-described proposed method may also be included as one of the implementation methods of the present disclosure, it is obvious that they may be regarded as a kind of proposed method. In addition, the above-described proposed methods may be implemented independently, but may be implemented in the form of a combination (or merge) of some of the proposed methods. The rule can be defined so that the base station informs the UE of information indicating whether the proposed methods are applicable (or information on the rules of the proposed methods) through a predefined signal (e.g., a physical layer signal or a higher layer signal).

The present disclosure may be embodied in other specific forms without departing from the technical idea and essential features described in the present disclosure. Therefore, the detailed description above should not be construed as restrictive in all respects and should be considered as illustrative. The scope of the present disclosure should be determined by reasonable interpretation of the appended claims, and all changes within the equivalent scope of the present disclosure are included in the scope of the present disclosure. In addition, the embodiments may be configured by combining claims that do not have an explicit citation relationship in the claims, or new claims may be included by amendment after the application is filed.

What is claimed is:

1. A method for receiving, by a terminal, a signal in a wireless communication system, the method comprising:
   receiving common message configuration information and private message configuration information from a base station;
   receiving, from the base station, a signal comprising a common message and a private message;
   decoding the common message based on the common message configuration information;
   restoring a frequency signal by using the decoded common message;
   subtracting the restored frequency signal of the common message from the received signal; and
   decoding the private message.

2. The method of claim 1, wherein a part of a message, which the base station transmits to the terminal, is transmitted to the terminal through the common message, and
   wherein the remaining part of the message, excluding the part of the message, is transmitted to the terminal through the private message.

3. The method of claim 2, wherein the common message is configured based on a partial message of each message of multiple terminals comprising the terminal.

4. The method of claim 1, wherein the common message configuration information comprises at least any one or more among a total number of bits of the common message, a number of message bits of the terminal comprised in the common message, a start position corresponding to a message of the terminal in the common message, bit to symbol mapping information of the common message, and encoder information of the common message.

5. The method of claim 1, wherein the private message configuration information comprises at least any one or more among a total number of bits of the private message, bit to symbol mapping information of the private massage, and encoder information of the private message.

6. The method of claim 1, wherein the terminal is configured to receive the common message configuration information and the private message configuration information in a form of downlink control information (DCI) from the base station in every slot via a control channel.

7. The method of claim 1, wherein the terminal is further configured to receive the common message configuration information and the private message configuration information from the base station through a medium access control (MAC) control element (CE).

8. The method of claim 1, wherein the terminal is further configured to:

generate common message feedback information based on measurement for the common message and generate private message feedback information based on measurement for the private message.

9. The method of claim 8, wherein the terminal is further configured to obtain, based on the measurement, at least any one or more among a signal noise ratio (SNR), a signal interference noise ratio (SINR), and decoding error information.

10. The method of claim 8, wherein the common message feedback information and the private message feedback information are transmitted to the base station through uplink control information (UCI).

11. The method of claim 10, wherein, based on the common message feedback information and the private message feedback information, rate splitting for the common message and the private message of the terminal is changed by the base station, and wherein, based on the changed rate splitting, the base station transmits changed common message configuration information and changed private message configuration information to the terminal.

12. The method of claim 11, wherein the base station is configured to:

receive common message feedback information and private message feedback information from each of multiple terminals and change rate splitting for the common message and the private message of the terminal by reflecting the common message feedback information and the private message feedback information for the each of the multiple terminals.

13. The method of claim 1, wherein the private message is a message that is obtained from the received signal, from which the restored frequency signal of the common message is subtracted, through channel estimation based on identification information of the terminal.

14. A terminal of a wireless communication system, the terminal comprising:

a transceiver; and a processor coupled to the transceiver, wherein the processor is configured to:

receive common message configuration information and private message configuration information from a base station through the transceiver, receive a signal comprising a common message and a private message from the base station through the transceiver, decode the common message based on the common message configuration information, restore a frequency signal by using the decoded common message, subtract the restored frequency signal of the common message from the received signal, and decode the private message.

15. A method for transmitting, by a base station, a signal in a wireless communication system, the method comprising:

transmitting common message configuration information and private message configuration information to each of multiple terminals; and transmitting, to the each of the multiple terminals, a signal comprising a common message and a private message for the each of the multiple terminals, wherein the each of the multiple terminals is configured to:

decode the common message based on the received common message configuration information on the each of the multiple terminals, restore a frequency signal by using the decoded common message, subtract the restored frequency signal of the common message from the received signal, and decode the private message.

* * * * *